(12) United States Patent
Ye et al.

(10) Patent No.: US 12,146,609 B2
(45) Date of Patent: *Nov. 19, 2024

(54) LOAD-STABILIZING APPARATUS

(71) Applicant: SZ DJI TECHNOLOGY CO., LTD., Shenzhen (CN)

(72) Inventors: Fangming Ye, Shenzhen (CN); Peng Bin, Shenzhen (CN); Peng Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,730

(22) Filed: Mar. 13, 2023

(65) Prior Publication Data
US 2023/0220951 A1     Jul. 13, 2023

Related U.S. Application Data

(63) Continuation of application No. 17/021,926, filed on Sep. 15, 2020, now Pat. No. 11,603,959, which is a
(Continued)

(30) Foreign Application Priority Data

Mar. 23, 2018   (WO) ................ PCT/CN2018/080366
Mar. 23, 2018   (WO) ................ PCT/CN2018/080367
(Continued)

(51) Int. Cl.
*G03B 17/56*     (2021.01)
*F16M 11/18*    (2006.01)
(Continued)

(52) U.S. Cl.
CPC ............. *F16M 11/24* (2013.01); *F16M 11/18* (2013.01); *G03B 17/561* (2013.01); *F16M 11/10* (2013.01);
(Continued)

(58) Field of Classification Search
CPC ................ G03B 17/561; F16M 11/18; F16M 2200/063; F16M 13/04
See application file for complete search history.

(56) References Cited

U.S. PATENT DOCUMENTS 3,945,597 A   3/1976 Klein
4,682,749 A   7/1987 Fritz
(Continued)

FOREIGN PATENT DOCUMENTS

CN   1246440 A   3/2000
CN   2742464 Y   11/2005
(Continued)

OTHER PUBLICATIONS

Zeyu LI, "Research on Three-axis Gimbal of Sensored FOC DC Brushless Motor Drive Technology", Electronics World, Feb. 2018, p. 49-52.
(Continued)

*Primary Examiner* — Bradley Duckworth
(74) *Attorney, Agent, or Firm* — ANOVA LAW GROUP, PLLC

(57) ABSTRACT

A load-stabilizing apparatus includes a load-connecting member configured to carry a load, a connecting assembly connected to the load-connecting member, and a stabilizing motor drivingly connected to the connecting assembly and configured to drive the connecting assembly to move, such that the connecting assembly drives the load-connecting member to move translationally.

20 Claims, 14 Drawing Sheets

Related U.S. Application Data continuation of application No. PCT/CN2019/078563, filed on Mar. 18, 2019.

(30) Foreign Application Priority Data

| Mar. 23, 2018 | (WO) | ................ PCT/CN2018/080368 |
| Mar. 23, 2018 | (WO) | ................ PCT/CN2018/080369 |
| Mar. 23, 2018 | (WO) | ................ PCT/CN2018/080370 |
| Mar. 23, 2018 | (WO) | ................ PCT/CN2018/080371 |
| Mar. 23, 2018 | (WO) | ................ PCT/CN2018/080372 |
| Mar. 23, 2018 | (WO) | ................ PCT/CN2018/080373 |

(51) Int. Cl.

| *F16M 11/24* | (2006.01) |
| *F16M 11/10* | (2006.01) |
| *F16M 11/20* | (2006.01) |
| *F16M 13/04* | (2006.01) |

(52) U.S. Cl.
CPC ......... *F16M 11/2071* (2013.01); *F16M 13/04* (2013.01); *F16M 2200/044* (2013.01); *F16M 2200/063* (2013.01)

(56) References Cited

U.S. PATENT DOCUMENTS

| 5,201,234 | A | 4/1993 | Gull |
| 5,667,186 | A | 9/1997 | Luber et al. |
| 5,970,694 | A | 10/1999 | Knox, Jr. |
| 6,199,812 | B1 | 3/2001 | Schuepbach |
| 8,151,225 | B2 | 4/2012 | Kephart |
| 8,205,845 | B2 | 6/2012 | Hammer |
| 9,182,076 | B2 | 11/2015 | Simon et al. |
| 9,676,481 | B1 | 6/2017 | Buchmueller |
| 9,681,926 | B2 | 6/2017 | Ge et al. |
| 10,092,368 | B2 | 10/2018 | Voigt et al. |
| 10,670,183 | B2 | 6/2020 | Bin et al. |
| 11,603,959 | B2 * | 3/2023 | Ye ..................... F16M 11/123 |
| 2004/0084587 | A1 | 5/2004 | Ddsen |
| 2005/0232625 | A1 | 10/2005 | Chapman |
| 2007/0080275 | A1 | 4/2007 | Stachowski et al. |
| 2010/0059652 | A1 | 3/2010 | Brown |
| 2013/0306820 | A1 | 11/2013 | Sapper et al. |
| 2016/0305602 | A1 | 10/2016 | Carthey |
| 2017/0192338 | A1 | 1/2017 | Sun et al. |
| 2018/0002035 | A1 | 1/2018 | Neely |
| 2018/0023754 | A1 | 1/2018 | Hashiguchi |

FOREIGN PATENT DOCUMENTS

| CN | 101287945 A | 10/2008 |
| CN | 205022859 U | 12/2009 |
| CN | 101774431 A | 7/2010 |
| CN | 101886733 A | 11/2010 |
| CN | 201858497 U | 6/2011 |
| CN | 102493069 A | 6/2012 |
| CN | 103062599 A | 4/2013 |
| CN | 103115233 A | 5/2013 |
| CN | 203202545 U | 9/2013 |
| CN | 203204283 U | 9/2013 |
| CN | 103349569 A | 10/2013 |
| CN | 103770941 A | 5/2014 |
| CN | 103939718 A | 7/2014 |
| CN | 104127241 A | 11/2014 |
| CN | 104390110 A | 3/2015 |
| CN | 204420489 U | 6/2015 |
| CN | 104965524 A | 10/2015 |
| CN | 105045018 A | 11/2015 |
| CN | 105129080 A | 12/2015 |
| CN | 205186550 U | 4/2016 |
| CN | 105782678 A | 7/2016 |
| CN | 205479113 U | 8/2016 |
| CN | 205534966 U | 8/2016 |
| CN | 205534967 U | 8/2016 |
| CN | 205606108 U | 9/2016 |
| CN | 106143937 A | 11/2016 |
| CN | 106454222 A | 2/2017 |
| CN | 106488131 A | 3/2017 |
| CN | 106678506 A | 5/2017 |
| CN | 206274111 U | 6/2017 |
| CN | 107024822 A | 8/2017 |
| CN | 206413079 U | 8/2017 |
| CN | 206437231 U | 8/2017 |
| CN | 206530832 U | 9/2017 |
| CN | 107241912 A | 10/2017 |
| CN | 107250654 A | 10/2017 |
| CN | 107278246 A | 10/2017 |
| CN | 206582509 U | 10/2017 |
| CN | 107351120 A | 11/2017 |
| CN | 107435791 A | 12/2017 |
| CN | 107466378 A | 12/2017 |
| CN | 107483781 A | 12/2017 |
| DE | 202012011389 U1 | 2/2013 |
| EP | 1312850 A2 | 5/2003 |
| EP | 3028662 A1 | 6/2016 |
| EP | 3505445 A1 | 7/2019 |
| FR | 2870317 A1 | 11/2005 |
| FR | 2856445 B1 | 6/2006 |
| GB | 201400186 | 2/2014 |
| JP | 2005134602 A | 5/2005 |
| JP | 2007183356 A | 7/2007 |
| JP | 2011118017 A | 6/2011 |
| JP | 2015203715 A | 11/2015 |
| SU | 591797 A1 | 10/1979 |
| TW | 201502411 A | 1/2015 |
| WO | 03046431 A1 | 6/2003 |
| WO | 2014039981 A1 | 3/2014 |
| WO | 2015055850 A2 | 4/2015 |
| WO | 2015055850 A3 | 4/2015 |
| WO | 2015119488 A1 | 8/2015 |
| WO | 2017132812 A1 | 8/2017 |
| WO | 2017132813 A1 | 8/2017 |
| WO | 2017132814 A1 | 8/2017 |

OTHER PUBLICATIONS

The World Intellectual Property Organization (WIPO) International Search Report and Written Opinion for PCT/CN2019/078563 Jun. 19, 2019 7 pages.
The World Intellectual Property Organization (WIPO) International Search Report for PCT/CN2018/080366 Jun. 29, 2018 6 pages.
The World Intellectual Property Organization (WIPO) International Search Report for PCT/CN2018/080367 Dec. 27, 2018 7 pages.
The World Intellectual Property Organization (WIPO) International Search Report for PCT/CN2018/080368 Nov. 30, 2018 8 pages.
The World Intellectual Property Organization (WIPO) International Search Report for PCT/CN2018/080369 Dec. 27, 2018 6 pages.
The World Intellectual Property Organization (WIPO) Intentional Search Report for PCT/CN2018/080370 Dec. 27, 2018 7 pages.
The World Intellectual Property Organization (WIPO) International Search Report for PCT/CN2018/080371 Jul. 30, 2018 8 pages.
The World Intellectual Property Organization (WIPO) International Search Report for PCT/CN2018/080372 Dec. 27, 2018 6 pages.
The World Intellectual Property Organization (WIPO) International Search Report for PCT/CN2018/080373 Aug. 9, 2018 8 pages.

* cited by examiner

LOAD-STABILIZING APPARATUS

CROSS-REFERENCE TO RELATED APPLICATIONS

This application is a continuation of U.S. patent application Ser. No. 17/021,926, filed on Sep. 15, 2020, which is a continuation of International Application No. PCT/CN2019/078563, filed on Mar. 18, 2019, which claims priority to PCT Application Nos. PCT/CN2018/080366, PCT/CN2018/080367, PCT/CN2018/080368, PCT/CN2018/080369, PCT/CN2018/080370, PCT/CN2018/080371, PCT/CN2018/080372, PCT/CN2018/080373, all filed on Mar. 23, 2018, the entire contents of all of which are incorporated herein by reference.

TECHNICAL FIELD

The present disclosure relates to photographing technology and, more particularly, to a load-stabilizing apparatus, a gimbal apparatus, and a photographing apparatus.

BACKGROUND

In order to achieve anti-vibration photography and increase the photographing stability to obtain higher-quality images during the use of a photographing device, the photographing device is generally mounted at a portable stabilization platform, such as a gimbal. The gimbal generally has the stabilizing function in a rotation direction of the photographing device. For example, a three-axis gimbal compensates for the vibration of the photographing device in the rotation direction of a pitch axis, the rotation direction of a yaw axis, and the rotation direction of a roll axis. However, the gimbal does not have a stabilizing function for a vibration of the photographing device in the direction of gravity.

SUMMARY

In accordance with the disclosure, there is provided a load-stabilizing apparatus including a load-connecting member configured to carry a load, a parallelogram mechanism connected to the load-connecting member, and a stabilizing motor drivingly connected to the parallelogram mechanism. The stabilizing motor is configured to drive the parallelogram mechanism to deform, such that the parallelogram mechanism drives the load-connecting member to move.

Also in accordance with the disclosure, there is provided a load-stabilizing apparatus includes a load-connecting member configured to carry a load, a connecting assembly connected to the load-connecting member, and a stabilizing motor drivingly connected to the connecting assembly. The stabilizing motor is configured to drive the connecting assembly to move, such that the connecting assembly drives the load-connecting member to move translationally.

Also in accordance with the disclosure, there is provided a load-stabilizing apparatus including a load-connecting member configured to carry a load, and a deformation mechanism connected to the load-connecting member. The deformation mechanism is deformable and has a plurality of deformation states including a first stabilization state and a second stabilization state. When the deformation mechanism is in the first stabilization state, the load-stabilizing apparatus is in a first stabilization mode, and when the deformation mechanism is in the second stabilization state, the load-stabilizing apparatus is in a second stabilization mode different from the first stabilization mode.

Also in accordance with the disclosure, there is provided a load-stabilizing apparatus including a connecting assembly connected to a load-connecting member, an elastic member configured to provide an elastic force to the connecting assembly, and an adjustment assembly connected to the elastic member. The adjustment assembly is configured to adjust the elastic member to provide the elastic force in a plurality of directions including a first elastic direction and a second elastic direction different from the first elastic direction. When the elastic member provides the elastic force in the first elastic direction, the load-stabilizing apparatus is in a first stabilization mode, and when the elastic member provides the elastic force in the second elastic direction, the load-stabilizing apparatus is in a second stabilization mode different from the first stabilization mode.

Also in accordance with the disclosure, there is provided a load-stabilizing apparatus includes a connecting assembly connected to a load-connecting member, a force-transferring member drivingly connected to the connecting assembly, a stabilizing motor drivingly connected to the force-transferring member and configured to drive the connecting assembly to move via the force-transferring member, and a blocking member configured to block the force-transferring member when the stabilizing motor drive the force-transferring member to pass a preset position.

DETAILED DESCRIPTION

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. When a first component is referred to as "arranged" at a second component, it is intended that the first component may be directly arranged at the second component or may be indirectly arranged at the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

In the situation where the technical solutions described in the present disclosure are not conflicting, they can be combined.

Figure 1:
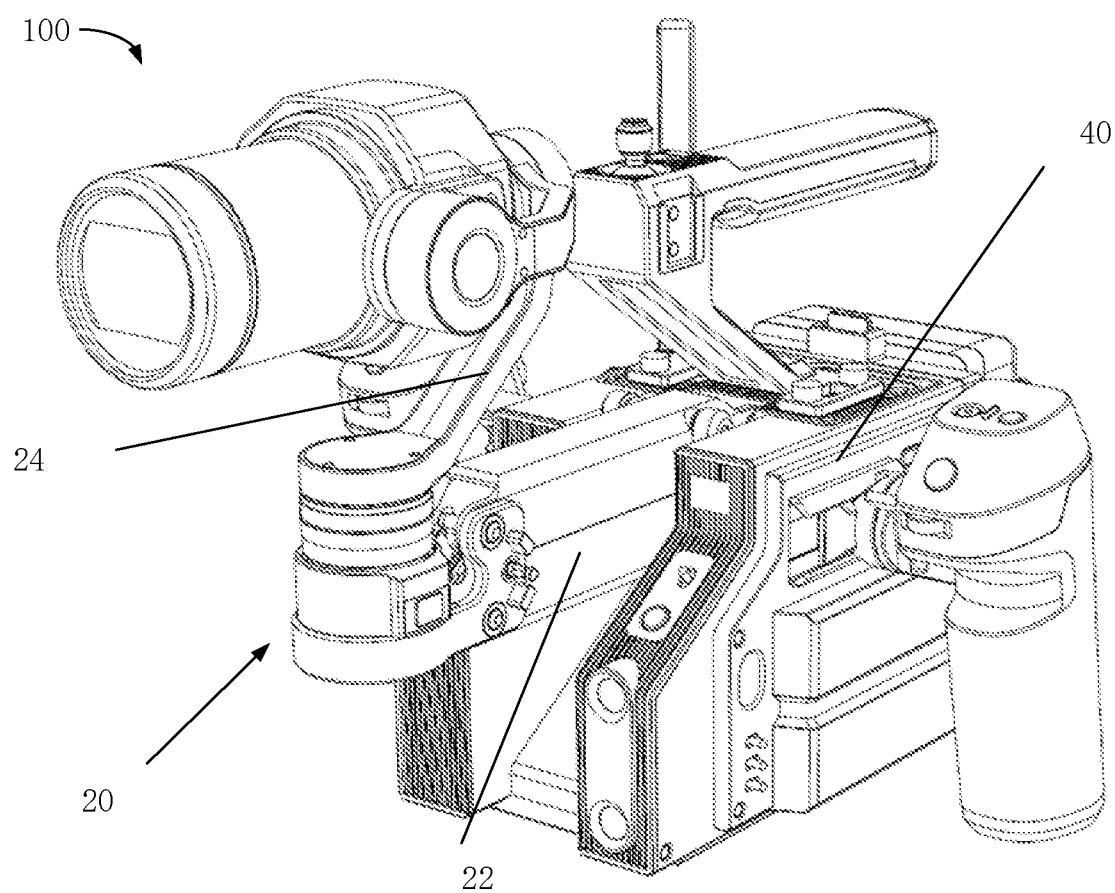
FIG. 1 is a schematic diagram showing a photographing apparatus consistent with embodiments of the disclosure.

FIG. 1 is a schematic diagram showing an example photographing apparatus 100 consistent with the disclosure. As shown in FIG. 1, the photographing apparatus 100 includes a photographing device C, a gimbal apparatus 20, and a supporting device 40.

The photographing device C is configured to capture images or videos, and can include, but is not limited to, a camera, a video camera, or a mobile phone or tablet having a camera function.

The supporting device 40 is connected to the gimbal apparatus 20 and configured to support the gimbal apparatus 20. In some embodiments, the supporting device 40 can be a handheld supporting device that can be held by a user. In some other embodiments, the supporting device 40 can be a non-handheld supporting device arranged on, for example, an unmanned aerial vehicle (UAV), an unmanned vehicle, a driverless ship, or the like, for supporting the gimbal apparatus 20.

The gimbal apparatus 20 is configured to carry the photographing device C, and can be configured to change a photographing angle of the photographing device C and compensate for the influence of vibrations on the photographing device C. As shown in FIG. 1, the gimbal apparatus 20 includes a load-stabilizing apparatus 22 and a gimbal 24.

Figure 2:
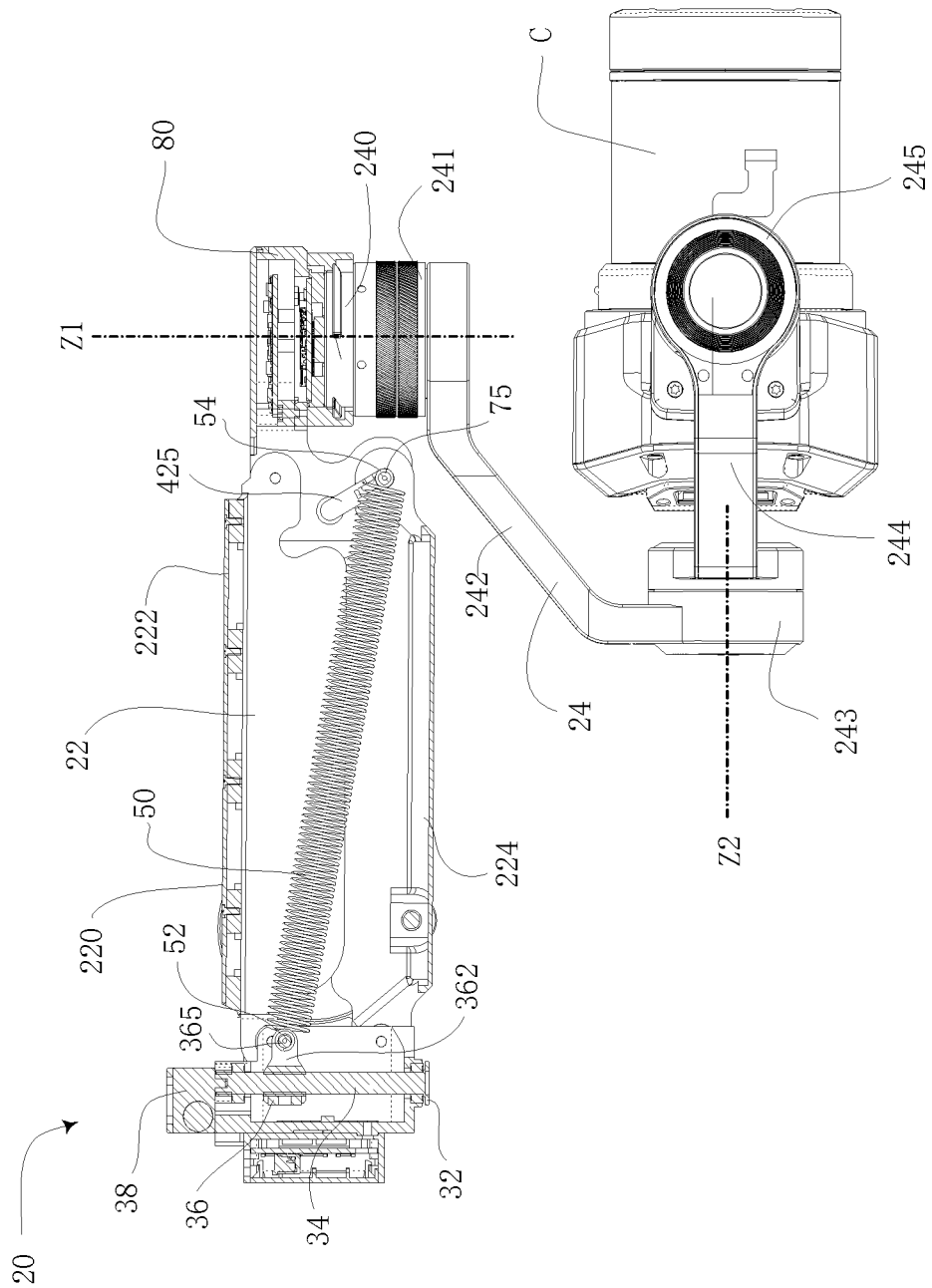
FIG. 2 is a schematic diagram showing a gimbal apparatus consistent with embodiments of the disclosure.
Figure 3:
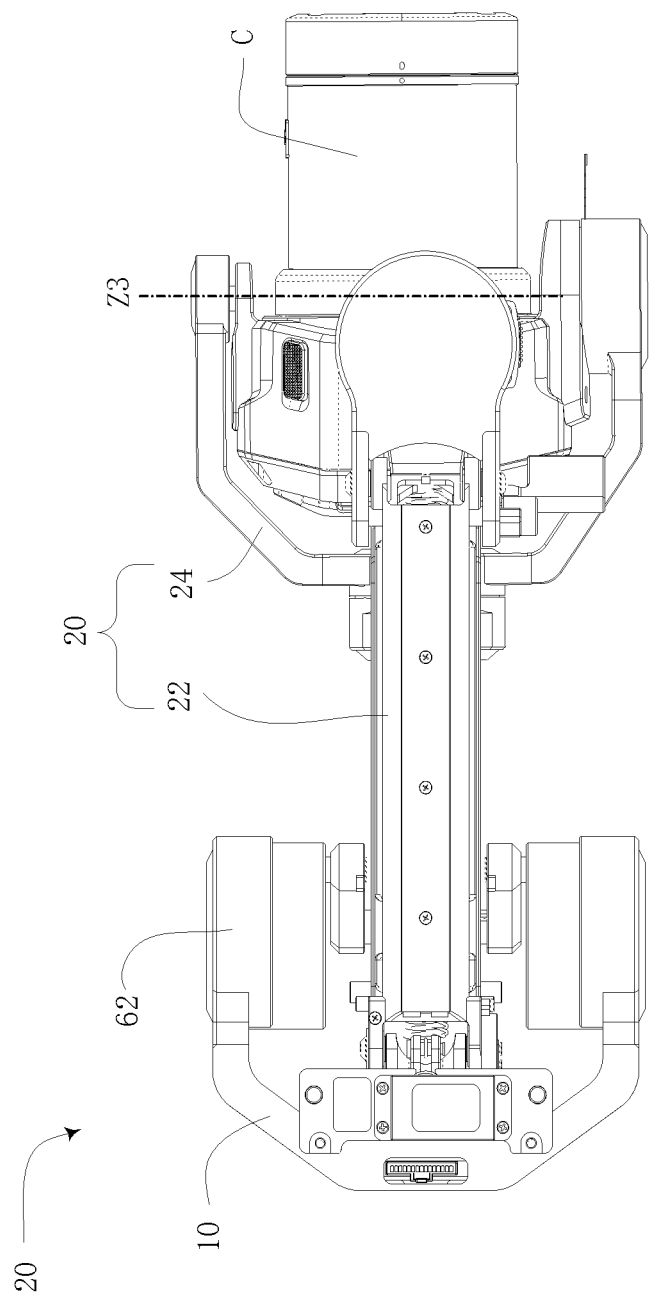
FIG. 3 is a top view of a gimbal apparatus consistent with embodiments of the disclosure.

FIG. 2 is a schematic diagram showing an example gimbal apparatus 20 consistent with the disclosure. FIG. 3 is a top view of the gimbal apparatus 20 consistent with the disclosure. In some embodiments, the gimbal 24 can be a three-axis gimbal. The three-axis gimbal can adjust the angles of the photographing device C around a yaw axis, a roll axis, and a pitch axis. For example, as shown in FIG. 2, the gimbal 24 includes a first-axis driver 241, a first bracket 242, a second-axis driver 243, a second bracket 244, and a third-axis driver 245. The first bracket 242 is connected to the first-axis driver 241 and can be driven by the first-axis driver 241 to rotate about the first axis Z1. The second-axis driver 243 is fixedly arranged at an end of the first bracket 242 distal from the first-axis driver 241. The second bracket 244 is connected to the second-axis driver 243 and can be driven by the second-axis driver 223 to rotate about the second axis Z2. The third-axis driver 245 is fixedly arranged at an end of the second bracket 244 distal from the second-axis driver 243. As shown in FIG. 3, the photographing device C is connected to the third-axis driver 245 and can be driven by the third-axis driver 245 to rotate about the third axis Z3. The first-axis driver 241, the second-axis driver 243, and the third-axis driver 245 can be, e.g., brushless motors. In some other embodiments, the gimbal 24 can be a single-axis gimbal, a two-axis gimbal, or any other type of gimbal.

In some embodiments, the gimbal 24 can also include a sensor (not shown in FIG. 2) and a processor (not shown in FIG. 2). The sensor can be configured to sense an attitude of the gimbal 24 and/or an attitude of the photographing device C. For example, the sensor may include an inertial measurement unit (IMU) for measuring the attitudes, such as an angular rate of each rotating axis of the gimbal 24, an accelerating rate of the photographing device C, and/or the like. As another example, the sensor may include an angle sensor, such as a photoelectric encoder, for measuring the rotation angle at each rotating axis of the gimbal 24. The type of the sensor is not limited herein.

The processor can be configured to control at least one of the first-axis driver 241, the second-axis driver 243, and the third-axis driver 245, according to the attitude information obtained by the sensor, to eliminate the effect of the vibration of the photographing apparatus 100 in the axial direction on the photographing device C. That is, the gimbal has a stabilizing function in the axial direction and can be regarded as a stabilizing mechanism in the axial direction. For example, the processor can control at least one of the first-axis driver 241, the second-axis driver 243, and the third-axis driver 245 to rotate in a direction opposite to the vibration direction of the photographing apparatus 100 to eliminate the effect of the vibration of the photographing apparatus 100 in the axial direction on the photographing device C.

In some embodiments, the processor can be further configured to control at least one of the first-axis driver 241, the second-axis driver 243, and the third-axis driver 245 in response to user's instruction information to achieve a photographing at an angle or direction desired by the user.

As shown in FIG. 2, the gimbal 24 further includes a joint component 240 fixedly connected to the first-axis driver 241. The joint component 240 can be connected to the load-stabilizing apparatus 22. The joint component 240 can further include an electrical connecting portion (not shown in FIG. 2). When the gimbal 24 and the load-stabilizing apparatus 22 are connected to each other, the electrical connecting portion can electrically couple the photographing device C, and/or the first-axis driver 241, the second-axis driver 243, and the third-axis driver 245 to the other electronic components (e.g., power supply, control panel, processor, or the like, arranged at other locations).

Figure 4:
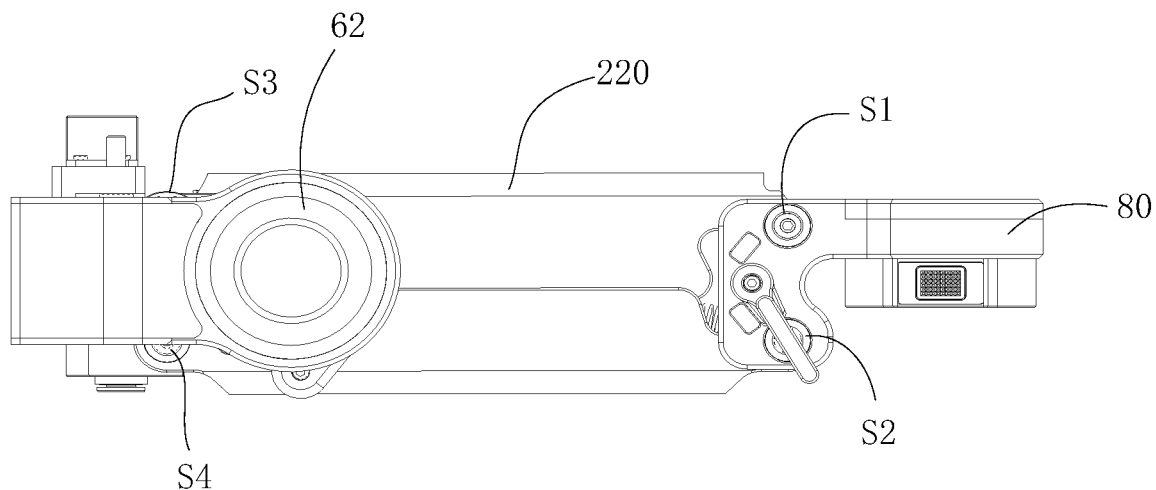
FIG. 4 is a side view of a load-stabilizing apparatus consistent with embodiments of the disclosure.
Figure 5:
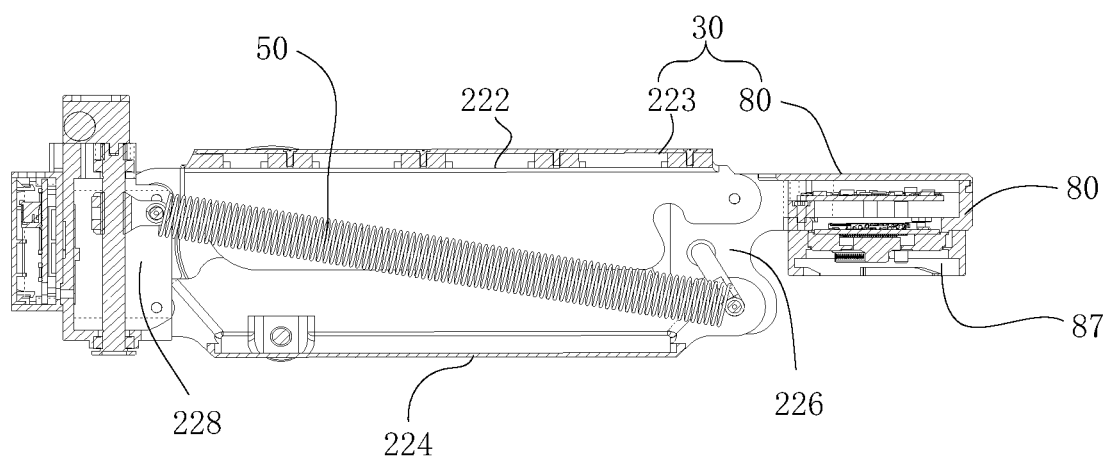
FIG. 5 is a cross-sectional view of a load-stabilizing apparatus consistent with embodiments of the disclosure.
Figure 6:
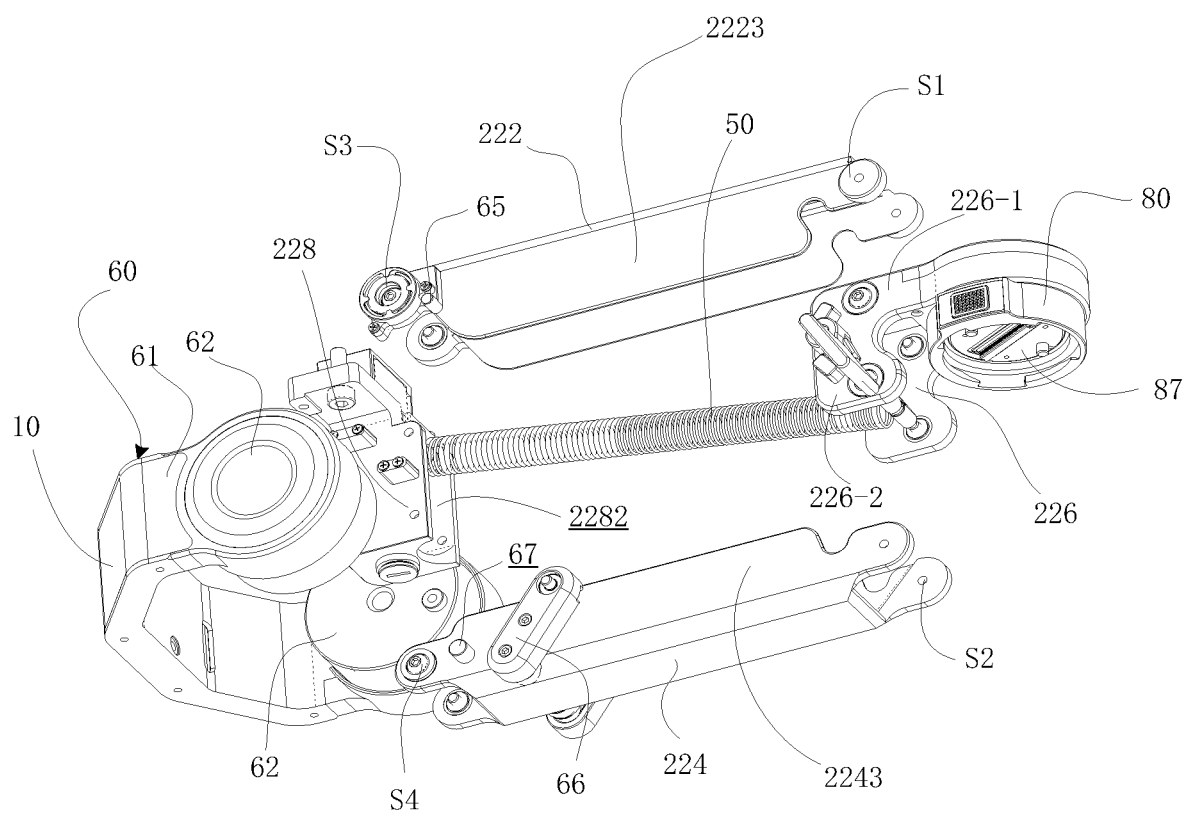
FIG. 6 is an exploded perspective view of a load-stabilizing apparatus consistent with embodiments of the disclosure.

FIG. 4 is a side view of the load-stabilizing apparatus 22 consistent with the disclosure. FIG. 5 is a cross-sectional view of the load-stabilizing apparatus 22 consistent with the disclosure. FIG. 6 is an exploded perspective view of the load-stabilizing apparatus 22 consistent with the disclosure.

As shown in FIGS. 2 and 4, the load-stabilizing apparatus 22 includes a stabilizing motor 62, a load-connecting member 80, and a connecting assembly 220. The load-connecting member 80 is configured to carry a load. The load-connecting member 80 can also be referred to as a load connector or a load bearer. The load can include a photographing device, such as a camera, a video camera, a mobile phone or tablet having a camera function, or the like, and/or a gimbal. The connecting assembly 220 is connected to the load-connecting member 80. In some embodiments, as shown in FIG. 2, the load-connecting member 80 is connected to the joint component 240. For example, as shown in FIGS. 2 and 5, an interface 87 is provided at an end of the load-connecting member 80 and configured to be connected to the load, e.g., the gimbal 24 in the embodiments of the disclosure. The joint component 240 can be inserted into the interface 87 to realize the connection between the load-connecting member 80 and the joint component 240. The joint component 240 can be engaged, threaded, or interference fit with the load-connecting member 80.

The stabilizing motor 62 is drivingly connected to the connecting assembly 220 and configured to drive the connecting assembly 220 to move, such that the connecting assembly 220 drives the load-connecting member 80 to move translationally. An angle between the load-connecting member 80 and the connecting assembly 220 is configured to gradually change when the connecting assembly 220 moves. It can be appreciated that the stabilizing motor 62 can be any type of motor.

Therefore, the load-stabilizing apparatus 22 can utilize the stabilizing motor 62 to drive the gimbal 24 and the photographing device C arranged at the gimbal 24 to move in a direction opposite to a vibration of the photographing device C in the vertical direction (the gravity direction), such that the vibration of the photographing device C in the vertical direction can be compensated for. Thus, the image jitter caused by the vibration of the photographing device C during image shooting can be improved.

The connecting assembly 220 can transmit the movement of the stabilizing motor 62 to the load-connecting member 80 to cause the load-connecting member 80 to move in the vertical direction. The connection assembly 220 can include, but is not limited to, a rack and pinion mechanism, a slider crank mechanism, a ball screw, and/or the like. In some embodiments, the connection assembly 220 can include a deformation mechanism. The stabilizing motor 62 can drive the deformation mechanism to deform. In some embodiments, the deformation mechanism can include a parallelogram mechanism 223.

In some embodiments, as shown in FIGS. 2, 5, and 6, the parallelogram mechanism 223 includes a first connecting arm 222, a second connecting arm 224, and a first supporting arm 226 rotatably connected to the first connecting arm 222 and the second connecting arm 224. The first connecting arm 222 and the second connecting arm 224 are parallel to each other. The load-connecting member 80 is connected to the first supporting arm 226. The connecting assembly 223 and the load-connecting member 80 collectively form a load-supporting assembly 30. The stabilizing motor 62 is drivingly connected to at least one of the first connecting arm 222 or the second connecting arm 224.

As shown in FIG. 6, the load-stabilizing apparatus 22 further includes a base 60. The base 60 can also be referred to as a supporting member. The parallelogram mechanism 223 further includes a second supporting arm 228. The second supporting arm 228 is arranged opposite to the first supporting arm 226 and fixedly connected to the base 60. An end of the first connecting arm 222 and an end of the second connecting arm 224 are connected to the first supporting arm 226, and another end of the first connecting arm 222 and another end of the second connecting arm 224 are rotatably connected to the second supporting arm 228. When the parallelogram mechanism 223 is moving, the second supporting arm 228 can be considered as a relatively fixed, i.e., immovable, component, and the first connecting arm 222, the second connecting arm 224, and the first supporting arm 226 are moving about the second supporting arm 228. The parallelogram mechanism 223 can be regarded as a four-bar linkage mechanism, and the first connecting arm 222, the second connecting arm 224, the first supporting arm 226, and the second supporting arm 228 can be regarded as four arms of the four-bar linkage mechanism.

In some embodiments, the first supporting arm 226 and the load-connecting member 80 are one-piece molded. "One-piece molded" or "one-piece molding" means that two components are integrally formed with each other. For example, in this disclosure, the first supporting arm 226 can be integrally formed with the load-connecting member 80. In some other embodiments, the first supporting arm 226 can be fixedly attached to the load connection portion 80 in a detachable manner or in a non-detachable manner. The second supporting arm 228 can be arranged at or attached to the base 60. In some embodiments, the second supporting arm 228 and the base 60 are one-piece molded. In some other embodiments, the second supporting arm 228 can also be fixedly attached to the base 60 in a detachable manner or in a non-detachable manner.

As shown in FIG. 6, the first connecting arm 222 includes two first protruding portions 2223 extending from opposite edges of the first connecting arm 222 toward the second connecting arm 224. The second connecting arm 224 includes two second protruding portions 2243 extending from opposite edges of the second connecting arm 224 toward the first connecting arm 222. As such, the first connecting arm 222 and the second connecting arm 224 form a cavity.

As shown in FIG. 6, each first protruding portion 2223 includes two ear portions extending from opposite ends of the first protruding portion 2223 along a length direction of the first protruding portion 2223. Each second protruding portion 2243 includes two ear portions extending from opposite ends of the second protruding portion 2243 along a length direction of the second protruding portion 2243.

As shown in FIG. 6, the first supporting arm 226 includes two side portions opposite to each other. Each of the two side portions has an L-shape-like structure and includes a first arm 226-1 and a second arm 226-2. During operation, the first arm 226-1 can be maintained approximately parallel to the ground. The second arm 226-2 is approximately vertical to the first arm 226-1. In some embodiments, the first arm 226-1 and the second arm 226-2 can be one-piece molded. The load-connecting member 80 is connected to the first arm 226-1. In some embodiments, a distance between the two side portions is greater than a width of the first connecting arm 222 and a width of the second connecting arm 224. A width of the second supporting arm 228 is smaller than the width of the first connecting arm 222 and the width of the second connecting arm 224. The width of the first connecting arm 222 is different from the width of the second connecting arm 224.

As shown in FIGS. 4 and 6, the two ends of the first connecting arm 222 are respectively hinged with the first supporting arm 226 and the second supporting arm 228. In some embodiments, the ear portion of each first protruding portion 2223 proximal to the first supporting arm 226 is hinged with the first arm 226-1 of the corresponding side portion arranged near a first end of the corresponding side portion. The first end of the side portion is an end of the first arm 226-1 distal from the load-connecting member 80. The hinge point of the ear portion of each first protruding portion 2223 and the first supporting arm 226 is denoted as S1. The ear portion of each second protruding portion 2243 proximal to the first supporting arm 226 is hinged with the second arm 226-2 of the corresponding side portion arranged near a second end of the corresponding side portion. The second end of the side portion is an end of the second arm 226-2 distal from the first arm 226-1. The hinge point of the ear portion of each second protruding portion 2243 and the first supporting arm 226 is denoted as S2.

The ear portions of the two first protruding portions 2223 proximal to the second supporting arm 228 are hinged with opposite sides of the second supporting arm 228 at positions near a first end of the second supporting arm 228. The first end of the second supporting arm 228 is an end of the second supporting arm 228 proximal to the ear portions of the two first protruding portions 2223. The hinge point of the ear portion of each first protruding portion 2223 and the second supporting arm 228 is denoted as S3. The ear portions of the two second protruding portions 2243 proximal to the second supporting arm 228 are hinged with the opposite sides of the second supporting arm 228 at positions near a second end of second supporting arm 228. The second end of the second supporting arm 228 is an end of the second supporting arm 228 proximal to the ear portions of the two second protruding portions 2243. The hinge point of the ear portion of each second protruding portion 2243 and the second supporting arm 228 is denoted as S4.

A line connecting the hinge points S1 and S3 can be denoted as S1S3, and a line connecting the hinge points S2 and S4 can be denoted as S2S4. The line S1S3 and the line S2S4 can be parallel to each other and have the same length. That is, the first connecting arm 222, the second connecting arm 224, the first supporting arm 226, and the second supporting arm 228 can form a parallelogram structure. An angle between the adjacent arms (e.g., the angle between the first connecting arm 222 and the first supporting arm 226, or the angle between the second connecting arm 224 and the first supporting arm 226) can vary. However, no matter how the angles change, the opposite arms are always approximately parallel to each other (e.g., the first connecting arm 222 is approximately parallel to the second connecting arm 224 and the first supporting arm 226 is approximately parallel to the second supporting arm 228). Further, during operation, while adjacent arms move relative to each other, the first arm 226-1 of the first supporting arm 226 can be maintained approximately parallel to the ground and the second arm 226-2 of the first supporting arm 226 can be maintained approximately vertical to the ground. The first connecting arm 222, the second connecting arm 224, the first supporting arm 226, and the second supporting arm 228 can be regarded as four arms of the four-bar linkage mechanism as noted above. That is, the lines S1S3, S2S4, S1S2, and S3S4 of the adjacent hinge points can represent the four arms of the four-bar linkage mechanism.

The stabilizing motor 62 can be rotatably connected to at least one of the first connecting arm 222 or the second connecting arm 224 and drive the first connecting arm 222 and/or the second connecting arm 224 to rotate clockwise or counterclockwise relative to the second supporting arm 228, thereby causing the first supporting arm 226 to rise or fall. In some embodiments, as shown in FIG. 6, the stabilizing motor 62 is arranged at a side of the base 60.

As shown in FIG. 6, the load-stabilizing apparatus 22 further includes a force-transferring member 66 movably connected to the parallelogram mechanism 223 and the stabilizing motor 62, such that the stabilizing motor 62 can drive the parallelogram mechanism 223 to deform via the force-transferring member 66. In some embodiments, the force-transferring member 66 can be rotatably connected to the parallelogram mechanism 223 and the stabilizing motor 62.

In some embodiments, the force-transferring member 66 and the stabilizing motor 62 can form a slider-crank mechanism. A hinge (not shown in FIG. 6) can be arranged at a rotor of the stabilizing motor 62 and the force-transferring member 66 can be rotatably connected to the stabilizing motor 62 via the hinge. The hinge can be spaced apart from a rotating shaft of the stabilizing motor 62. In some embodiments, the rotor of the stabilizing motor 62 and the hinge can be one-piece molded.

In some embodiments, as shown in FIG. 6, the stabilizing motor 62 can be a first stabilizing motor and the load-stabilizing apparatus 22 further includes a second stabilizing motor. The first stabilizing motor and the second stabilizing motor are symmetrically arranged at opposite sides of the parallelogram mechanism 223, and can be arranged to be co-axial to each other. In some embodiments, the first stabilizing motor and the second stabilizing motor are symmetrically arranged at opposite sides of the base 60. One or both of the first stabilizing motor and the second stabilizing motor can be connected to at least one of the first connecting arm 222 or the second connecting arm 224. For example, as shown in FIG. 6, the first stabilizing motor and the second stabilizing motor are connected to the second connecting arm 224. The first stabilizing motor can rotate synchronously with the second stabilizing motor, such that the first stabilizing motor and the second stabilizing motor can together drive the parallelogram mechanism 223 to deform.

In some embodiments, the force-transferring member 66 is a first force-transferring member rotatably connected to the first stabilizing motor and the parallelogram mechanism 223. In these embodiments, the load-stabilizing apparatus 22 further includes a second force-transferring member rotatably connected to the second stabilizing motor and the parallelogram mechanism 223. The first force-transferring member and the second force-transferring member are arranged symmetrically at opposite sides of the parallelogram mechanism 223. For example, as shown in FIG. 6, the first force-transferring member and the second force-transferring member are arranged at opposite outer sides of the two second protruding portion 2243 of the second connecting arm 224 and proximal to the base 60.

In some embodiments, as shown in FIG. 6, the base 60 includes a base body 10 connected to the parallelogram mechanism 223, and a base extending arm 61 extending outward from an end of the base body 10. The second supporting arm 228 is fixedly connected to the base body 10. The stabilizing motor 62 is arranged at the base extending arm 61. In some embodiments, the base extending arm 61 is a first base extending arm and the base further includes a second base extending arm. The second stabilizing motor is arranged at the second base extending arm extending outward from another end of the base body 10. The first base extending arm and the second base extending arm are respectively bent and extended from two ends of the base body 10 toward a side of the base body 10 proximal to the parallelogram mechanism 223, such that the base 60 has a U-shape-like structure. In some embodiments, the base body 10, the first base extending arm, and the second extending arm can be one-piece molded.

Figure 7:
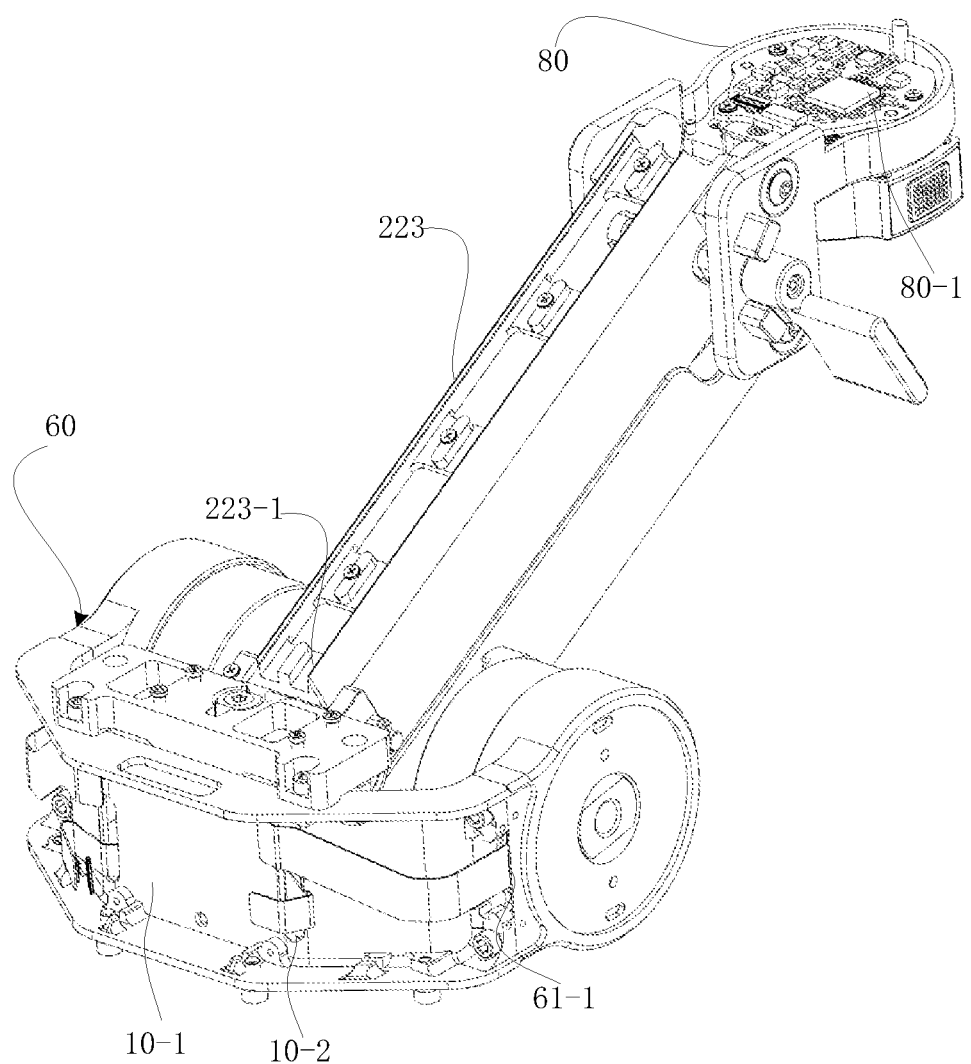
FIG. 7 is a perspective view of a load-stabilizing apparatus consistent with embodiments of the disclosure.
Figure 8:
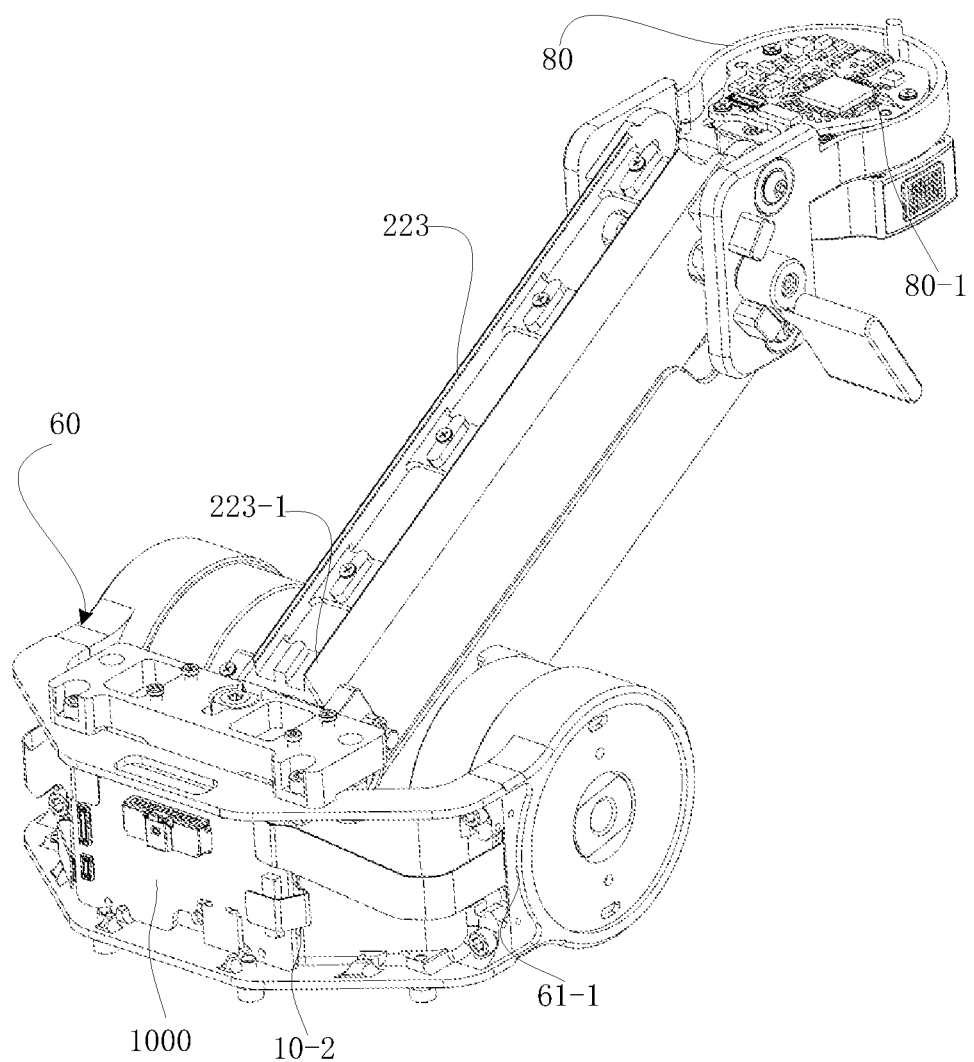
FIG. 8 is another perspective view of a load-stabilizing apparatus consistent with embodiments of the disclosure.

FIG. 7 is a perspective view of the load-stabilizing apparatus 22 consistent with the disclosure. FIG. 8 is another perspective view of the load-stabilizing apparatus 22 consistent with the disclosure. As shown in FIGS. 7 and 8, each of the base extending arms 61 includes a receiving channel 61-1 for receiving an electrical signal transmission wire of the corresponding stabilizing motor 62. For example, the first base extending arm includes the receiving channel 61-1 for receiving the electrical signal transmission wire of the first stabilizing motor, and the second base extending arm includes the receiving channel 61-1 for receiving the electrical signal transmission wire of the second stabilizing motor. Each receiving channel 61-1 can be arranged inside the corresponding base extending arms 61.

In some embodiments, as shown in FIGS. 7 and 8, the base body 10 includes a receiving space 10-1 for receiving a control circuit 1000. The control circuit 1000 can be configured to control the two stabilizing motors 62 and/or transmit a power signal to the two stabilizing motors 62 via the electrical signal transmission wires of the two stabilizing motors 62. In some embodiments, the electrical signal transmission wires of the two stabilizing motors 62 can also transmit rotation angle information of the two stabilizing motors 62.

In some embodiments, as shown in FIG. 7, the base body 10 further includes a through hole 10-2 in communication with the receiving space 10-1. An electrical signal transmission wire of a motion sensor can pass through the through hole 10-2. In some embodiments, the motion sensor can include at least one of an angle sensor or an Inertial Measurement Unit (IMU). In some other embodiments, the motion sensor can include at least one of a sensor for measuring motion data of the load-connecting member 80 or a sensor for measuring a rotation angle of the parallelogram mechanism 223. The rotation angle of the parallelogram mechanism 223 can be an angle of the parallelogram mechanism 223 rotating relative to the base 60.

In some embodiments, as shown in FIG. 7, the load-connecting member 80 includes a receiving recess 80-1 for receiving a motion-detecting circuit. The motion-detecting circuit can be mounted at the load-connecting member 80 and configured to measure motion of the load-connecting member 80. In some embodiments, the motion-detecting circuit can include a motion sensor configured to obtain the motion data of the load-connecting member 80. The motion sensor can include, for example, an IMU.

In some embodiments, a detection circuit can be mounted at the parallelogram mechanism 223 and configured to measure a motion of the parallelogram mechanism 223. The detection circuit can include an angle sensor configured to measure the rotation angle of the parallelogram mechanism 223. In some embodiments, the angle sensor can be configured to measure a rotation angle of at least one of the first connecting arm 222 or the second connecting arm 224.

In some embodiments, the interface 87 can include a quick-release connector (not shown in FIGS. 7 and 8). The load-connecting member 80 can be detachably connected to the load via the quick-release connector. In some embodiments, the interface 87 can include an electrical signal interface. The electrical signal interface can be configured to transmit an input electrical signal to the load and/or receive an output electrical signal outputted by the load. The input electrical signal can include at least one of a power signal or a load control signal. For example, the load control signal can be the signal to control a shooting operation of the load. The output electrical signal can include sensing data collected by the load. For example, the sensing data collected by the load can be the image or video captured by the load. In some embodiments, the electrical signal interface can also transmit an input signal to the gimbal 24 and/or receive an output signal outputted by the gimbal 24. For example, the input signal can include the power signal and/or a control command to control a movement of the gimbal 24. The output signal can include, e.g., rotation angle information of the gimbal 24.

In some embodiments, as shown in FIG. 7, the parallelogram mechanism 223 includes at least one threading channel 223-1. An electrical signal transmission wire communicationally connected to the electrical signal interface can be arranged in the at least one threading channel 223-1. In some embodiments, an electrical signal transmission wire electrically connected to the motion-detecting circuit can be arranged in the at least one threading channel 223-1. In some embodiments, the at least one threading channel 223-1 can be arranged at the first connecting arm 222, at the second connecting arm 224, or between the first connecting arm 222 and the second connecting arm 224.

Referring again to FIG. 6, the load-stabilizing apparatus 22 further includes an elastic member 50. The elastic member 50 is configured to provide an elastic force to the connecting assembly 220. A vertical component of the elastic force generated by the elastic member 50 can be used to balance a weight of the photographing device C, a weight of the gimbal 24, and/or a weight of the load-stabilizing apparatus 22.

In some embodiments, the elastic member 50 is arranged inside the cavity of connecting assembly 220, which is formed by the first connecting arm 222 and the second connecting arm 224. In some embodiments, the elastic member 50 can include a spring (e.g., a coil spring). The elastic member 50 can be mounted at the load-stabilizing apparatus 22 in various manners. For example, an end 52 (see, e.g., FIGS. 2, 10, 11, 14, and 15) of the elastic member 50 can be mounted at the second supporting arm 228 or the base body 10, and another end 54 (see, e.g., FIGS. 2, 10, 11, 14, and 15) of the elastic member 50 can be mounted at the first supporting arm 226, the first connecting arm 222, or the second connecting arm 224, as long as the elastic member 50 can provide the elastic force to balance or partially balance the weight of the load (e.g., the photographing device C, the gimbal 24, or the like). In some embodiments, a position of the end 54 of the elastic member 50 can be adjusted to adjust the elastic direction of the elastic member 50.

Figure 9:
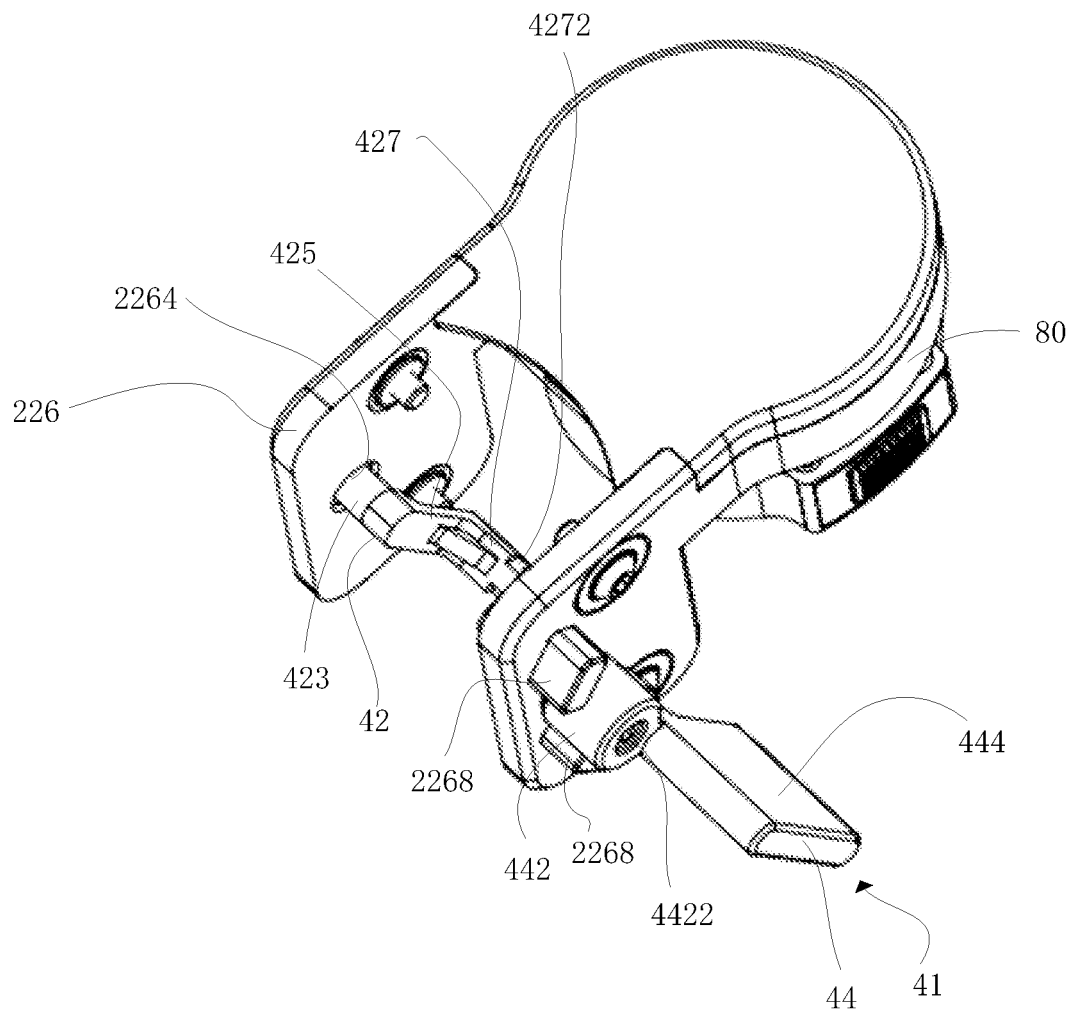
FIG. 9 is a perspective view of a switching assembly consistent with embodiments of the disclosure.

In some embodiments, the load-stabilizing apparatus 22 further includes a switching assembly 41 arranged at the deformation mechanism. FIG. 9 is a perspective view of the switching assembly 41 consistent with the disclosure. The switching assembly 41 can be rotatably connected to the deformation mechanism and configured to adjust an elastic direction of the elastic member 50. As shown in FIG. 9, the switching assembly 41 includes a switching member 42, a switching handle 44, and an engaging member 442.

The switching member 42 is connected to the end 54 of the elastic member 50. The end 54 of the elastic member 50 can also be referred to as an active end. In some embodiments, the switching member 42 includes a crankshaft. As shown in FIG. 9, the crankshaft includes two shaft portions 423, an eccentric portion 427, and two connecting portions 425. The two shaft portions 423 are arranged at two opposite sides of the crankshaft. The eccentric portion 427 is arranged at a middle part of the crankshaft and deviates from a rotation axis of the two shaft portions 423. The two connecting portions 425 extend from the two shaft portions 423 and are connected between the two shaft portions 423 and the eccentric portion 427.

As shown in FIG. 9, the first supporting arm 226 further includes two shaft holes 2264 at the two side portions of the first supporting arm 226, respectively. The two shaft portions 423 can be rotatably mounted at the first supporting arm 226 through the shaft holes 2264. A line connecting the two shaft holes 2264 is a rotation axis of the crankshaft. The eccentric portion 427 is arranged at a distance from the rotation axis of the crankshaft, and the distance is determined by a length of the two connecting portions 425.

The eccentric portion 427 includes a notch 4272 and the end 54 of the elastic member 50 proximal to the first supporting arm 226 is hooked to the notch 4272. In some embodiments, a rotatable connection between the elastic member 50 and the eccentric portion 427 can be achieved by hooking a hook (not shown in FIG. 9) of the end 54 of the elastic member 50 in the notch 4272. As such, the position of the end 54 of the elastic member 50 can be changed with a rotation of the eccentric portion 427. Thereby, the elastic direction and elastic strength of the elastic member 50 can be changed and the end 54 can be rotated relative to the notch 4272.

The switching handle 44 is fixedly connected to the switching member 42 and configured to receive an external force to drive the switching member 42 to rotate to adjust a position of the end 54 of the elastic member 50. In some embodiments, the switching handle 44 includes a rotating portion 444. For example, a user can apply a force to the rotating portion 444 to control the switching member 42 to rotate. The rotating portion 444 can have a plate shape that is convenient for the user to rotate.

The engaging member 442 is connected to the switching handle 44 and the switching member 42. In some embodiments, as shown in FIG. 9, the engaging member 442 has a cylindrical shape and includes a shaft mounting hole 4422. The shaft portion 423 of the crankshaft distal from the switching handle 44 can penetrate through the shaft hole 2264 and another shaft portion 423 proximal to the switching handle 44 can be inserted into the shaft mounting hole 4422.

The crankshaft can be driven to rotate by the rotating portion 444, thereby driving the end 54 of the elastic member 50 to switch among different positions. The eccentric portion 427 and the end 54 of the elastic member 50 can stay at any position during the rotation of the crankshaft. In some embodiments, the rotating portion 444 can rotate clockwise or counterclockwise within a certain range of angles, and can stably stay and remain at two limiting positions (one of the two limiting positions corresponds to a limiting position of clockwise rotation, and another limiting position corresponds to a limiting position of counterclockwise rotation).

As shown in FIG. 9, the deformation mechanism further includes two stopper members (or simply "stoppers") 2268. The two stopper members 2268 are arranged at an upper position and a lower position of an outer side of one of the two side portions of the first supporting arm 226 proximal to the switching handle 44. The stopper member 2268 arranged at the upper position can also be referred to as a first stopper member, and another stopper member 2268 arranged at the lower position can also be referred to as a second stopper member. The two stopper members 2268 are configured to hold the rotating portion 444 at a position corresponding to a normal position of the end 54 of the elastic member 50 or a position corresponding to an inverse position of the end 54 of the elastic member 50. The rotating portion 444 can be held to the two limiting positions because of the blocking of the stopper members 2268 and the elastic force of the elastic member 50.

Figure 10:
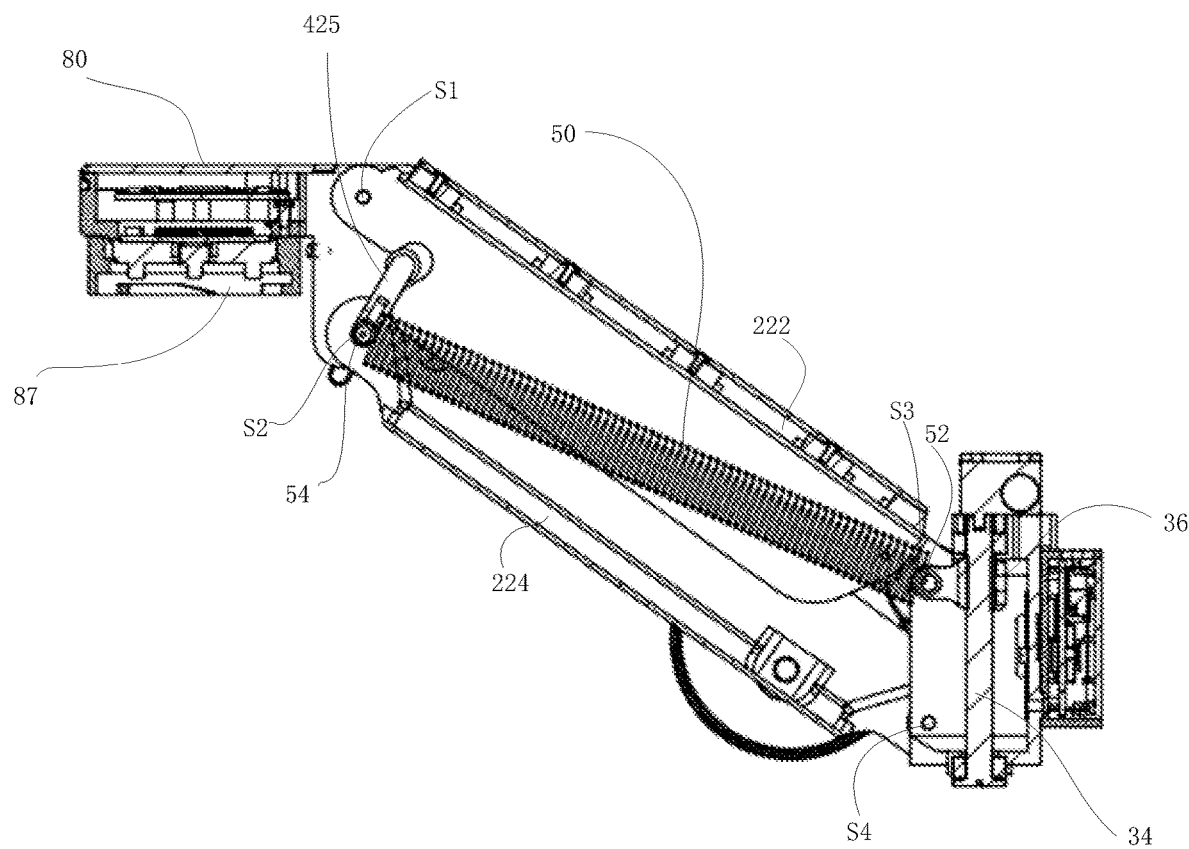
FIG. 10 is a cross-sectional view of a load-stabilizing apparatus in a first stabilization mode consistent with embodiments of the disclosure.
Figure 11:
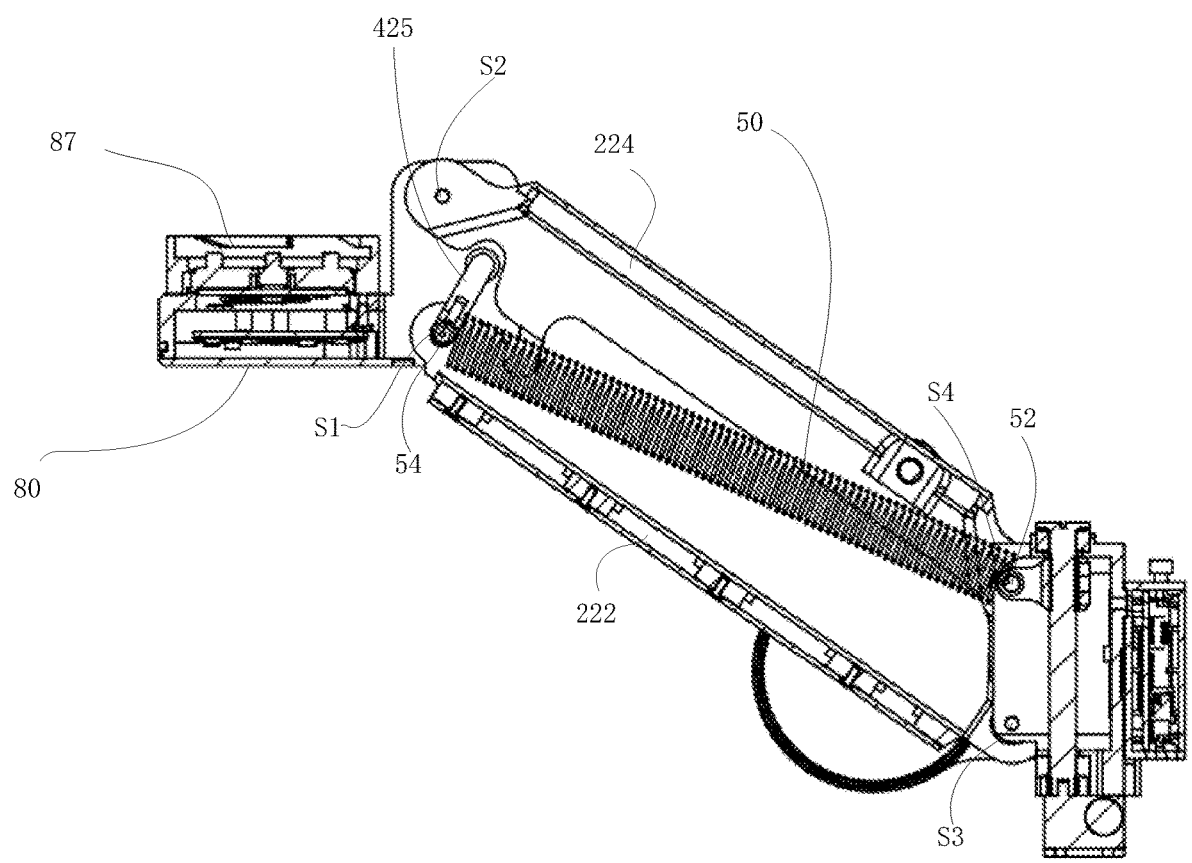
FIG. 11 is a cross-sectional view of a load-stabilizing apparatus in a second stabilization mode consistent with embodiments of the disclosure.
Figure 12:
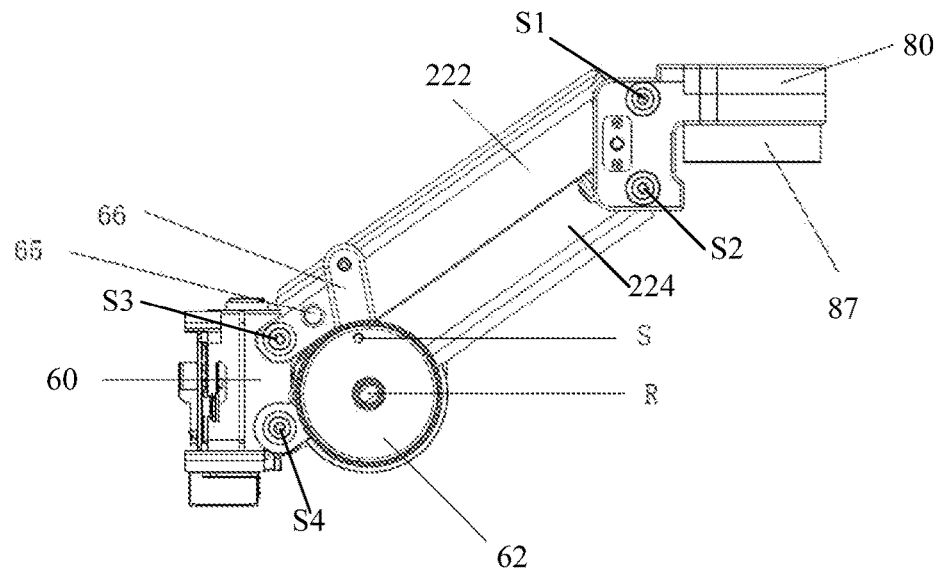
FIG. 12 is a side view of a load-stabilizing apparatus in a first stabilization mode consistent with embodiments of the disclosure.

FIG. 10 is a cross-sectional view of the load-stabilizing apparatus 22 in a first stabilization mode consistent with the disclosure. FIG. 11 is a cross-sectional view of the load-stabilizing apparatus 22 in a second stabilization mode consistent with the disclosure. FIG. 12 is a side view of the load-stabilizing apparatus 22 in the first stabilization mode consistent with the disclosure. As shown in FIG. 10, the normal position of the end 54 of the elastic member 50 is a position closer to the second connecting arm 224 than the first connecting arm 222 and can also be referred to as a first active end position. As shown in FIG. 11, the inverse position of the end 54 of the elastic member 50 is a position closer to the first connecting arm 222 than the second connecting arm 224 and can also be referred to as a second active end position.

When the end 54 is in the first active end position, the elastic direction of the elastic member 50 is in a first elastic direction, and a first side of the engaging member 442 abuts the first stop member under the elastic force in the first elastic direction. The first side of the engaging member 442 is a side of the engaging member 442 proximal to the first stop member. When the switching member 42 adjusts the end 54 from the first active end position to the second active end position, the elastic direction of the elastic member 50 is in a second elastic direction, and a second side of the engaging member 442 abuts the second stop member under the elastic force in the second elastic direction. The second side of the engaging member 442 is a side of the engaging member 442 proximal to the second stop member.

In some embodiments, the load-stabilizing apparatus 22 can have the first stabilization mode and the second stabilization mode corresponding to the first elastic direction and the second elastic direction of the elastic member 50. An attitude of the load-stabilizing apparatus 22 in the second stabilization mode turns 180 degree in the vertical direction (i.e., upside-down) as compared to the attitude of the load-stabilizing apparatus 22 in the first stabilization mode. In some embodiments, an orientation of the interface 87 of the load-connecting member 80 in the first stabilization mode can be different from the orientation of the interface 87 in the second stabilization mode, such that a mounting attitude of the load carried by the load-connecting member in the first stabilization mode can be different from the mounting attitude in the second stabilization mode.

In some embodiments, the orientation of the interface 87 of the load-connecting member 80 in the first stabilization mode can be opposite to the orientation of the interface 87 in the second stabilization mode, such that the mounting attitude in the first stabilization mode can be opposite to the mounting attitude in the second stabilization mode. For example, as shown in FIG. 10, when the load-stabilizing apparatus 22 is in the first stabilization mode, the interface 87 faces downward and the load carried by the load-connecting member 80 is in a normal attitude, e.g., an upright mounting attitude. As shown in FIG. 11, when the load-stabilizing apparatus 22 is in the second stabilization mode, the interface 87 faces upward and the load carried by the load-connecting member 80 is in an inverse attitude, e.g., an upside-down mounting attitude.

As shown in FIGS. 10 and 11, the deformation mechanism can be deformable and can have a plurality of deformation states. For example, the plurality of deformation states can include a first stabilization state and a second stabilization state. When the deformation mechanism is in the first stabilization state, the load-stabilizing apparatus 22 is in the first stabilization mode. When the deformation mechanism is in the second stabilization state, the load-stabilizing apparatus 22 is in the second stabilization mode.

A relative position of the first connecting arm 222 with respect to the second connecting arm 224 in the first stabilization state is different from the relative position in the second stabilization state. In some embodiments, the relative position of the first connecting arm 222 with respect to the second connecting arm 224 in the first stabilization state can be opposite to the relative position in the second stabilization state. For example, as shown in FIG. 10, in the first stabilization state, the first connecting arm 222 is above the second connecting arm 224. On the other hand, as shown in FIG. 11, in the second stabilization state, the first connecting arm 222 is below the second connecting arm 224.

In some embodiments, a length of a diagonal of the parallelogram mechanism 223 in the first stabilization state is different from the length of the diagonal of the parallelogram mechanism 223 in the second stabilization state. For example, the diagonal of the parallelogram mechanism 223 can be a line connecting the hinge points S1 and S4, which can be denoted as S1S4 and also referred to as a first diagonal. A second diagonal of the parallelogram mechanism 223 can be a line connecting the hinge points S2 and S3, which can be denoted as S2S3. The second diagonal S2S3 intersects the first diagonal S1S4. In some embodiments, as shown in FIG. 10, in the first stabilization mode, the length of the first diagonal S1S4 can be greater than a length of the second diagonal S2S3 of the parallelogram mechanism 223. On the other hand, as shown in FIG. 11, in the second stabilization mode, the length of the first diagonal S1S4 can be shorter than the length of the second diagonal S2S3. The positions of the hinge points S1, S2, S3, and S4 are also shown in FIG. 12.

In some embodiments, one or more vertex angles of the parallelogram mechanism 223 in the first stabilization mode are different from the one or more vertex angles of the parallelogram mechanism 223 in the second stabilization mode. For example, a first vertex angle of the parallelogram mechanism 223 can be an angle between the line S1S3 and the line S1S2 and can be denoted as angle S2S1S3. A second vertex angle of parallelogram mechanism 223 can be an angle between the line S2S4 and the line S1S2, and can be denoted as angle S1S2S4. The second vertex angle S1S2S4 neighbors the first vertex angle S2S1S3. In some embodiments, as shown in FIG. 10, in the first stabilization mode, the first vertex angle S2S1S3 is smaller than the second vertex angle S1S2S4 of the parallelogram mechanism 223. On the other hand, and as shown in FIG. 11, in the second stabilization mode, the first vertex angle S2S1S3 is greater than the second vertex angle S1S2S4.

Therefore, when the load is intended to be mounted in the upright mounting attitude, the end 54 of the elastic member 50 can be switched to the position adjacent to the second connecting arm 224 by rotating the rotating portion 444. The change in the position of the end 54 of the elastic member 50 can cause the elastic direction of the elastic force to be changed to the first elastic direction. The deformation mechanism can swing upward relative to the base 60. The deformation mechanism can then switch to the first stabilizing state and the load-stabilizing apparatus 22 can be in the first stabilizing mode. When the load is intended to be mounted in the upside-down mounting attitude, the end 54 of the elastic member 50 can be switched to the position adjacent to the first connecting arm 222 by rotating the rotating portion 444. The change in the position of the end 54 of the elastic member 50 can cause the elastic direction of the elastic force to be changed to the second elastic direction. The deformation mechanism can swing downward relative to the base 60. The deformation mechanism can then switch to the second stabilizing state and the load-stabilizing apparatus 22 can be in the second stabilizing mode.

In some other embodiments, the rotating portion 444 for manual operation by a user can be omitted, and an automatic driving device (e.g., a switching motor) may be used. For example, the switching motor can be a brushless motor. A sensor can be arranged at the load-connecting member 80, the connecting assembly 220, the base 60, or the like, and configured to sense the attitude of the load-stabilizing apparatus 22. If the load-stabilizing apparatus 22 is determined to be in the first stabilizing mode, a process can control the switching motor to switch the position of the end 54 of the elastic member 50 to the first active end position. If the load-stabilizing apparatus 22 is determined to be in the second stabilizing mode, a process can control the switching motor to switch the position of the end 54 of the elastic member 50 to the second active end position.

In some embodiments, the elastic force can include a pulling force. When the deformation mechanism is under the pulling force in a first pulling direction, the deformation mechanism is in the first stabilization state. When the switching assembly 41 adjusts a pulling direction of the elastic member 50 from the first pulling direction to a second pulling direction, the deformation mechanism can be deformed to be in the second stabilization state by the pulling force in the second pulling direction. In some other embodiments, the elastic force can also include a compression force. When the switching assembly 41 adjusts a compressive direction of the elastic member 50 from the first compressive direction to a second compressive direction, the deformation mechanism can be deformed to be in the second stabilization state by the compression force in the second compressive direction.

Figure 13:
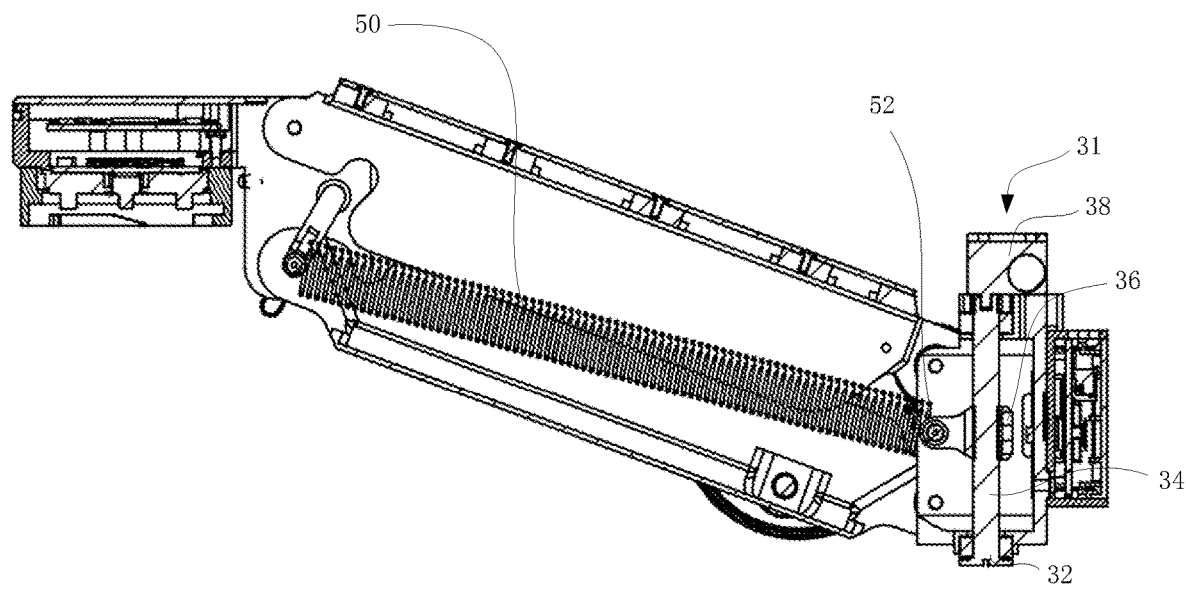
FIGS. 13 and 14 are schematic diagrams showing a load-stabilizing apparatus carrying loads with different weights.
Figure 14:
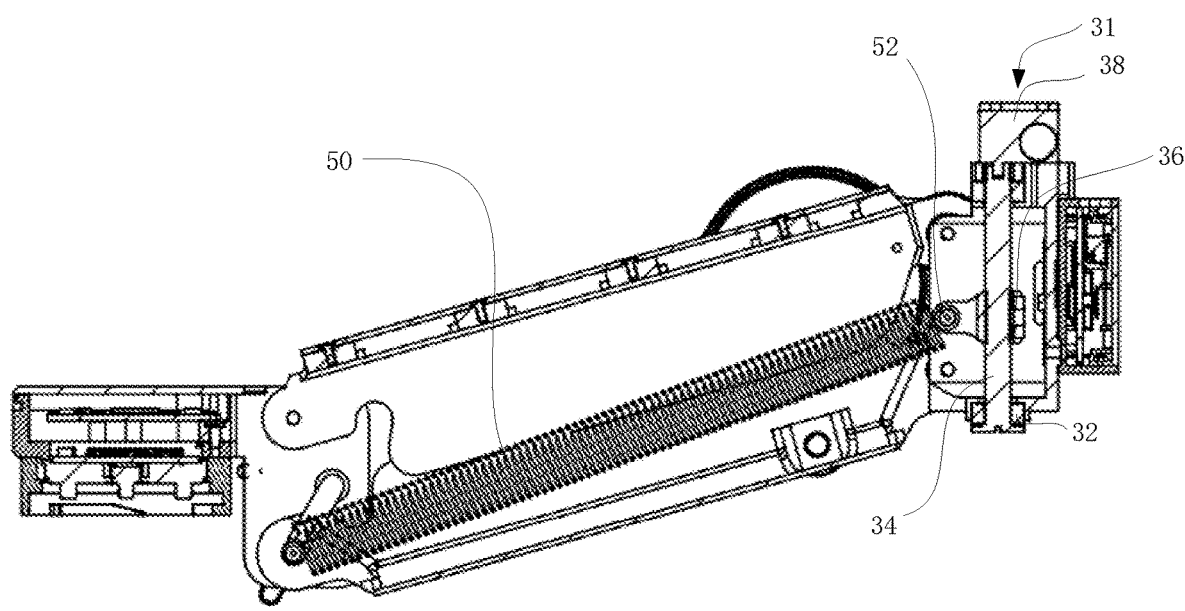

FIGS. 13 and 14 are schematic diagrams showing the load-stabilizing apparatus 22 carrying loads with different weights. As shown in FIGS. 13 and 14, the load-stabilizing apparatus 22 further includes an adjustment member 31. In some embodiments, the adjustment member 31 is arranged at the second supporting arm 228 and configured to adjust a degree of deformation of the elastic member 50. For example, when the elastic member 50 includes a spring, the degree of deformation of the elastic member 50 can include a deformation length of the spring. The elastic force of the elastic member 50 can be adjusted by adjusting the degree of deformation of the elastic member 50.

Therefore, the adjustment member 31 can adjust the elastic force of the elastic member 50 (e.g., a component of the elastic force in the vertical direction) via adjusting the degree of deformation of the elastic member 50, such that loads carried by the load-stabilizing apparatus 22 with different weights can be balanced. In some embodiments, the elastic force of the elastic member 50 can be maintained unchanged, the component of the elastic force in the vertical direction can be changed by adjusting the direction of the elastic force provided by the elastic member 50, such that the loads with different weights can be balanced. In some embodiments, the load with certain weight can be balanced by simultaneously adjusting a magnitude and the direction of the elastic force of the elastic member 50.

In some embodiments, the end 52 of the elastic member 50 is connected to the adjustment member 31. The adjustment member 31 can adjust the degree of deformation of the elastic member 50 by adjusting a mounting position of the end 52 of the elastic member 50 under an external force. When the degree of deformation of the elastic member 50 changes, the elastic member 50 can drive the load-supporting assembly 30 to rotate relative to the base 60 to adjust the position of the load carried by the load-connecting member 80 in a vertical movement stroke. For example, when the weight of the load is relatively large, the adjustment member 31 can be configured to adjust the mounting position of the end 52 on the adjustment member 31 toward a first direction under the external force to increase the degree of deformation of the elastic member 50. The first direction can be an upward direction or a downward direction.

Accordingly, the elastic member 50 can be configured, in response to the adjustment member 31 being adjusted to increase the degree of deformation of the elastic member 50, to drive the load-supporting assembly 30 to rotate relative to the base 60 in a first rotation direction, such that the position of the load in the vertical direction can be adjusted upwards. When the weight of the load is relatively small, the adjustment member 31 can be configured to adjust the mounting position of the end 52 on the adjustment member 31 toward a second direction under the external force to decrease the degree of deformation of the elastic member 50. The second direction can be opposite to the first direction. Accordingly, the elastic member 50 can be configured, in response to the adjustment member 31 being adjusted to decrease the degree of deformation of the elastic member 50, to drive the load-supporting assembly 30 to rotate relative to the base 60 in a second rotation direction, such that the position of the load in the vertical direction can be adjusted downwards. The second rotation direction can be opposite to the first rotation direction.

In some embodiments, the adjustment member 31 can balance the loads with different weights by adjusting a height of the end 52 of the elastic member 50 relative to the second supporting arm 228. As shown in FIGS. 13 and 14, the adjustment member 31 includes an adjusting lever 34, an adjusting sleeve 36 sleeved on the adjusting lever 34, and an operating portion 32 connected to the adjusting lever. The adjusting lever 34 can be rotatably arranged at the second supporting arm 228 or the base body 10. A length direction of the adjusting lever 34 is approximately parallel to a longitudinal direction of the second supporting arm 228. For example, the adjusting lever 34 can be arranged in the vertical direction. The adjusting lever 34 can have a cylindrical shape and have an external thread on a cylindrical surface. For example, the adjusting lever 34 can include a lead screw. A recess 2282 (see, e.g., FIG. 6) can be provided at a side of the second supporting arm 228 facing the first supporting arm 226. The adjusting level 34 can be arranged in the recess 2282, such that the adjusting sleeve 36 can extend into the recess 2282 and be connected to the adjusting lever 34.

In some embodiments, the adjusting sleeve 36 can include a sleeve portion having an internal thread, such as a lead nut. The internal thread of the adjusting portion can be engaged with the external thread of the adjusting level 34, such that a threaded connection of the adjusting sleeve 36 with the adjusting level 34 can be achieved. Therefore, when the adjusting lever 34 is rotated, the adjusting sleeve 36 can be vertically moved upward and downward with respect to the adjusting lever 34 and the second supporting arm 228.

Referring again to FIG. 2, in some embodiments, the adjusting sleeve 36 includes a mounting portion 365. The end 52 of the elastic member 50 can be rotatably connected to the mounting portion 365. For example, a protruding component 362 can protrude from a side of the sleeve portion. The protruding component 362 can have the mounting portion 365 having a cylindrical shape. The end 52 of the elastic member 50 can be provided with a hook (not shown), and the hook can be rotatably sleeved on the mounting component 365.

The operating portion 32 protrudes from a surface of the second supporting arm 228. The operating portion 32 allows the user to rotate the adjusting lever 34 directly or indirectly, so as to change a position of the adjusting sleeve 36 on the adjusting lever 34. In some embodiments, the operating portion 32 can have an approximately truncated cone shape, and a peripheral side surface of the operating portion 32 can include a surface having a certain roughness, such that the user can more easily operate the adjusting lever 34 to rotate. It can be appreciated that the operating portion 32 can also include an elliptical platform or a polygonal prismatic platform.

A connecting position of the adjusting sleeve 36 and the adjusting lever 34 can be adjusted by rotating the adjusting lever 34. That is, a connection height of the end 52 of the elastic member 50 with respect to the second supporting arm 228 can be adjusted. The elastic force of the elastic member 50 can be adjusted by adjusting the connection height of the end 52 of the elastic member 50 with respect to the second supporting arm 228. Therefore, the load-stabilizing apparatus 22 can adjust the elastic force of the elastic member 50 in accordance with the weight of the load. The load can be the photographing device C and the gimbal 24. In some embodiments, the load may only include the photographing device C or the gimbal 24.

In some embodiments, the load-stabilizing apparatus 22 further includes a position adjustment motor 38. The adjustment motor 38 can be configured to drive the adjusting lever 34 to rotate, thereby automatically adjusting the elastic force of the elastic member 50. In some embodiments, the position adjustment motor 38 can be arranged at one end of the second supporting arm 228. The position adjustment motor 38 can be any type of motor.

In some embodiments, to better achieve an accurate adjustment of the position adjustment motor 38, a sensor can be provided to obtain information related to the position of the load-connecting member 80. In some embodiments, a processor can be arranged at the load-stabilizing apparatus 22, for example in the receiving space of the base body 10, at the receiving recess 80-1 of the load-connecting member 80, or the like. The processor can be configured to control the position adjustment motor 38, according to the information, to rotate to actively adjust the force provided by the elastic member 50 to the load-supporting assembly 30 to adapt to the weight of the load. For example, the force provided by the elastic member 50 can be adjusted to cause an angle of the connecting assembly 220 relative to the base 60 to remain at a preset angle, such as 90 degrees. The preset angle can keep the first connecting arm 222 and the second connecting arm 224 in, for example, a horizontal or approximately horizontal direction, e.g., parallel or approximately parallel to the ground. As another example, the force provided by the elastic member 50 can be adjusted to cause the load to be in a preset position in a vertical motion trajectory.

In some embodiments, the sensor can include an angle sensor that can be used for assisting the processor in determining the amount and direction of the rotation of the position adjustment motor 38. For example, the angle sensor is configured to detect the angle of the connecting assembly 220 relative to the base 60. The position adjustment motor 38 can be configured, in response to the angle sensor detecting that the angle of the connecting assembly 220 relative to the base 60 is greater than 90 degrees, to drive the adjusting lever 34 to rotate in a direction to move the adjusting sleeve 36 toward the one end of the second supporting arm 228, and in response to the angle sensor detecting that the angle of the connecting assembly 220 relative to the base 60 is smaller than 90 degrees, to rotate in another direction to move the adjusting sleeve 36 toward another end of the second supporting arm 228.

For example, the angle sensor can be configured to detect an angle formed between the second connecting arm 224 and the second supporting arm 228. When the load tilts the second connecting arm 224 upward, as shown in FIG. 13, the angle measured by the angle sensor will be less than 90 degrees, and the processor can determine that the load is light, and the adjustment sleeve 36 needs to be lowered. Adjustment is made to change the direction of the elastic force of the elastic member 50 and shorten the length of the elastic member 50. Correspondingly, the processor will control the position adjustment motor 38 to rotate in a particular direction and with a particular amplitude, such that the second connecting arm 224 can be perpendicular to the second supporting arm 228.

As another example, when the load tilts the second connecting arm 224 downward, as shown in FIG. 14, the angle measured by the angle sensor will be larger than 90 degrees, and the processor can determine that the load is heavy, and the adjustment sleeve 36 needs to be raised. Adjustment is made to change the direction of the elastic force of the elastic member 50 and lengthen the length of the elastic member 50. Correspondingly, the processor will control the position adjustment motor 38 to rotate in a particular direction and with a particular amplitude, such that the second connecting arm 224 can be perpendicular to the second supporting arm 228. Therefore, whether the elastic member 50 matches the load can be determined by whether the second connecting arm 224 and the second supporting arm 228 are perpendicular (i.e., whether the angle measured by the angle sensor is 90 degrees). In some other embodiments, other angles may be used as a reference to determine whether the elastic member 50 matches the load, which is note limited herein.

In some embodiments, a plurality of mounting positions of the end 52 of the elastic member 50 connected to the adjustment assembly corresponding to a plurality of different weights of the load can be predetermined. The processor can be configured to recognize the load and automatically drive a motor to adjust the end 52 of the elastic member 50 to the corresponding predetermined mounting position. For example, the load can send an identification number (ID) of the load to the processor, such that the processor can recognize the load according to the ID.

The position of the adjustment assembly and the position of the switching assembly 41 can be interchangeable. That is, in some other embodiments, the adjustment assembly can be arranged at the first supporting arm 226 and the switching assembly 41 can be arranged at the second supporting arm 228. As such, the position of the end 52 of the elastic member 50 can be adjusted by the switching assembly 41, and the position of the end 54 of the elastic member 50 can be adjusted by the adjustment assembly.

In some embodiments, the connecting assembly 220 can include a slider-crank mechanism. In FIG. 12 a hinging point of the force-transferring member 66 and the stabilizing motor 62 is denoted as S. The rotating center of the stabilizing motor 62 is denoted as R. The force-transferring member 66 can operate as a slider in the slider-crank mechanism. The line connecting the hinging point S and the rotating center R of the stabilizing motor 62 can be denoted as SR (non-physical structure) and regarded as the crank of the slider-crank mechanism.

Figure 15:
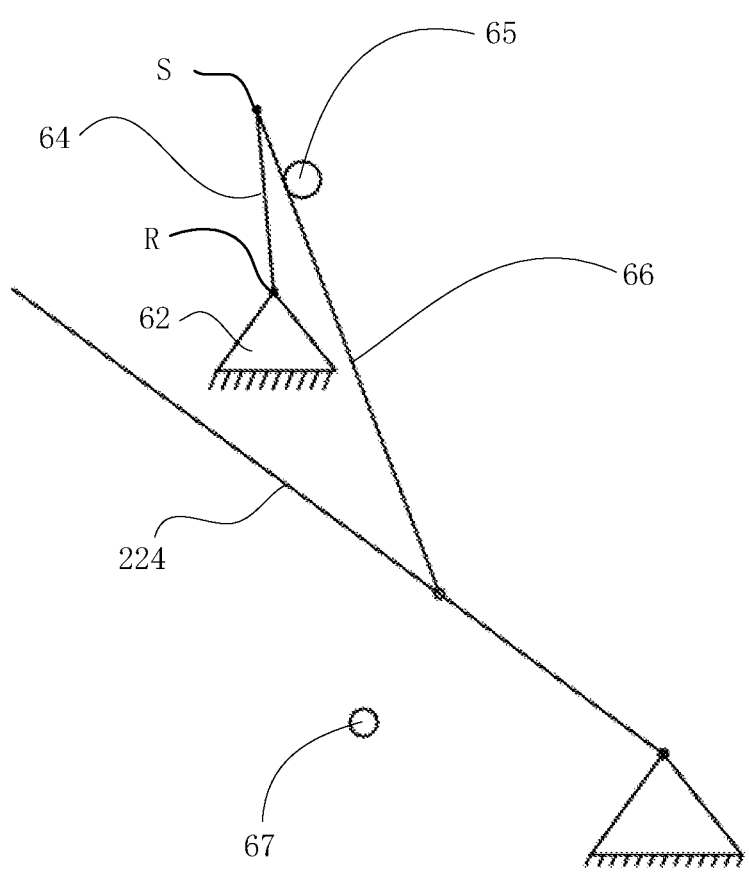
FIG. 15 is a schematic diagram showing a working process of a slider-crank mechanism consistent with embodiments of the disclosure.
Figure 16:
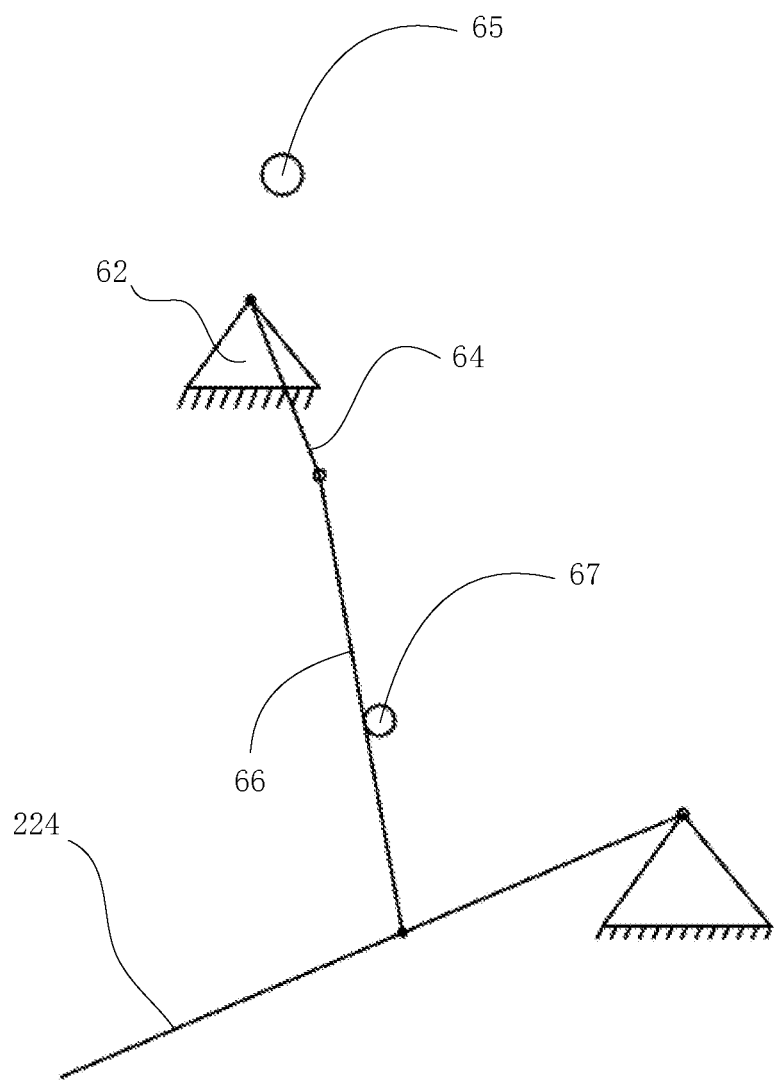
FIG. 16 is another schematic diagram showing a working process of a slider-crank mechanism consistent with embodiments of the disclosure.

FIG. 15 is a schematic diagram showing a working process of the slider-crank mechanism consistent with the disclosure. FIG. 16 is another schematic diagram showing the working process of the slider-crank mechanism consistent with the disclosure. In some other embodiments, as shown in FIGS. 15 and 16, the slider-crank mechanism includes a crank 64 (line SR shown in FIG. 12) and a slider 66 (the force-transferring member 66 shown in, e.g., FIG. 12). A first end of the crank 64 is connected to the stabilizing motor 62 in a coaxially rotating manner (the crank 64 rotates about the rotating center R of the stabilizing motor 62), and a second end of the crank 64 is hinged to a first end of the slider 66. A second end of the slider 66 is hinged to the second connecting arm 224 (shown in FIGS. 15 and 16 as an example) or the first connecting arm 222. The second connecting arm 224 can be rotatable relative to the second supporting arm 228. The stabilizing motor 62 can be fixed to the second supporting arm 228. The crank 64 is equivalent to the line SR.

During the rotation of the stabilization motor 62, the second connecting arm 224 can be reciprocated up and down driven by the slider 66 and has a highest position and a lowest position. In the highest position the crank 64 and the slider 66 are folded toward each other and hence at least partially overlap to form a first dead point. In the lowest position, the crank 64 and the slider 66 extend in two opposite direction and hence are connected in a straight line to form a second dead point. Thus, there are two dead points, i.e., a first dead point and a second dead point corresponding to the highest position and the lowest position, respectively. At the dead point, a force transmitted by the second connecting arm 224 and the slider 66 to the crank 64 does not produce a moment that can cause the crank 64 to rotate.

In some embodiments, the load-stabilizing apparatus 22 further includes a first blocking member 65 and a second blocking member 67. A blocking member can also be referred to as a "block." In some embodiments, the first blocking member 65 is arranged at an outer side of the first protruding portion 2223 of the first connecting arm 222, and the second blocking member 67 is arranged at an outer side of the second protruding portion 2243 of the second connecting arm 224. In some other embodiments, the first blocking member 65 can be arranged at the second connecting arm 224 and the second blocking member 67 can be arranged at the first connecting arm 222.

The first blocking member 65 is configured to block the force-transferring member 66 when the stabilizing motor 62 drive the force-transferring member 66 to pass a first preset position, and the second blocking member 67 is configured to block the force-transferring member 66 when the stabilizing motor 62 drive the force-transferring member 66 to pass a second preset position. In some embodiments, the first preset position can include one of the first dead end and the second dead end, and the second preset position can include another one of the first dead end and the second dead end.

For example, the first preset position can include the first dead end and the second preset position can include the second dead end. The elastic force of the elastic member 50 when the force-transferring member 66 is in the first preset position is smaller than the elastic force when the force-transferring member 66 is in a position other than the first preset position. The elastic force of the elastic member 50 when the force-transferring member 66 is in the second preset position is greater than the elastic force when the force-transferring member 66 is in a position other than the second preset position.

For example, the first blocking member 65 can be arranged at or proximal to a position corresponding to the highest position. The first blocking member 65 may be arranged at the first connecting arm 222. When the stabilizing motor 62 drives the crank 64 to rotate clockwise, the second connecting arm 224 can rotate clockwise and continuously rise. As shown in FIG. 15, when the crank 64 and the slider 66 are connected in a line (e.g., partially coincident with each other), the second connecting arm 224 will reach the highest position. The highest position corresponds to a clockwise limit position of the crank-slider mechanism. If continuing to rotate for a small amount in the clockwise direction, the slider 66 will contact the first blocking member 65.

In this scenario, the second connecting arm 224 at the highest position has a tendency to move downward. However, because the crank-slider mechanism has passed the clockwise limit position, the tendency of the second connecting arm 224 to move downward will translate into a tendency for the crank 64 and the slider 66 to rotate clockwise. Due to a blocking of the first blocking member 65, the crank 64 and the slider 66 cannot continue to rotate clockwise, such that the crank 64, the slider 66, the second connecting arm 224, and the like, can be stably fixed at the position of the first blocking member 65. Therefore, even if the stabilizing motor 62 is de-energized, the state of the slider 66 and the load-stabilizing apparatus 22 can be locked.

As another example, the second blocking member 67 can be arranged at or proximal to a position corresponding to the lowest position. The second blocking member 67 may be arranged at the second connecting arm 224. When the stabilizing motor 62 drives the crank 64 to rotate counterclockwise, the second connecting arm 224 can rotate counterclockwise and continuously fall. As shown in FIG. 16, when the crank 64 and the slider 66 are connected in a line without overlapping, the second connecting arm 224 will reach the lowest position. The lowest position corresponds to a counterclockwise limit position of the crank-slider mechanism. If continuing to rotate for a small amount in the counterclockwise direction, the slider 66 will contact the second blocking member 67.

In this scenario, the second connecting arm 224 at the lowest position has a tendency to move upward. However, because the crank-slider mechanism has passed the counterclockwise limit position, the tendency of the second connecting arm 224 to move upward will translate into a tendency for the crank 64 and the slider 66 to rotate counterclockwise. Due to a blocking of the second blocking member 67, the crank 64 and the slider 66 cannot continue to rotate counterclockwise, such that the crank 64, the slider 66, the second connecting arm 224, and the like, can be stably fixed at the position of the second blocking member 67. Therefore, even if the stabilizing motor 62 is de-energized, the state of the slider 66 and the load-stabilizing apparatus 22 can be locked.

In a normal working state of the load-stabilizing apparatus 22, the stabilization motor 62 can be configured to drive the crank 64 and the slider 66 to move between the highest position and the lowest position to realize an active stabilization function in the vertical direction.

When the load-stabilizing apparatus 22 is not required to be operated, the user can manually or use the stabilizing motor 62 to rotate the second connecting arm 224 at a large angle, such that the slider 66 can abut and stabilize at the position of the first blocking member 65 or the second blocking member 67.

Consistent with the disclosure, the crank-slider mechanism can cause the stabilization motor 62 to drive the second connecting arm 224 to swing back and forth, and can also provide the second connecting arm 224 with a locking function when the stabilization motor 62 is de-energized.

In some embodiments, only one blocking member is provided. For example, only the first blocking member 65 or only the second blocking member 67 is provided.

In some embodiments, the blocking member can be arranged at the first connecting arm 223. When the stabilizing motor 62 is rotated to a preset angle, the transmission member abuts the blocking member to block the load from moving in a specific vertical direction. For example, when the stabilizing motor 62 rotates, the connecting assembly 220 can be rotated relative to the base 60 via the force-transferring member 66, and the load carried by the load-connecting member 80 can be moved in the vertical direction. When the stabilizing motor 62 is rotated to the preset angle, the force-transferring member 66 abuts the blocking member to block the load from moving in the specific vertical direction. As such, when the stabilizing motor 62 is rotated to the preset angle, if the load or the connecting assembly 220 has a tendency to move in the specific vertical direction, the load is limited from moving in the specific vertical direction under the blocking of the blocking member.

Other embodiments of the disclosure will be apparent to those skilled in the art from consideration of the specification and practice of the embodiments disclosed herein. It is intended that the specification and described embodiments be considered as examples only and not to limit the scope of the disclosure, with a true scope and spirit of the invention being indicated by the following claims.

What is claimed is:

1. A load-stabilizing apparatus comprising:
   a load-connecting member configured to carry a load;
   a connecting assembly connected to the load-connecting member;
   a stabilizing motor drivingly connected to the connecting assembly and configured to drive the connecting assembly to move, such that the connecting assembly drives the load-connecting member to move translationally; and
   a control circuit configured to control the stabilizing motor to drive the load-connecting member to move in a direction opposite to a vibration of the load in a vertical direction via the connecting assembly, to compensate the vibration of the load.

2. The apparatus of claim 1, wherein:
   the connecting assembly includes a deformation mechanism drivingly connected to the stabilizing motor; and
   the stabilizing motor is configured to drive the deformation mechanism to deform.

3. The apparatus of claim 1, further comprising:
a force-transferring member movably connected to the connecting assembly and movably connected to the stabilizing motor;
wherein the stabilizing motor is configured to drive the connecting assembly to move via the force-transferring member.

4. The apparatus of claim 3, wherein:
the connecting assembly includes a deformation mechanism; and
the stabilizing motor is configured to drive the deformation mechanism to deform via the force-transferring member.

5. The apparatus of claim 3, wherein the force-transferring member is rotatably connected to the stabilizing motor.

6. The apparatus of claim 3, wherein the force-transferring member and the stabilizing motor form a slider-crank mechanism.

7. The apparatus of claim 1,
wherein the stabilizing motor is a first stabilizing motor;
the apparatus further comprising:
a second stabilizing motor, the first stabilizing motor and the second stabilizing motor together driving the connecting assembly to move.

8. The apparatus of claim 7, wherein:
the connecting assembly includes a deformation mechanism; and
the first stabilizing motor and the second stabilizing motor together drive the deformation mechanism to deform.

9. The apparatus of claim 8, wherein:
the deformation mechanism includes a parallelogram mechanism;
the parallelogram mechanism includes:
a first connecting arm;
a second connecting arm; and
a supporting arm rotatably connected to the first connecting arm and the second connecting arm; and
each of the first stabilizing motor and the second stabilizing motor is connected to at least one of the first connecting arm or the second connecting arm of the parallelogram mechanism.

10. The apparatus of claim 9, further comprising:
a first force-transferring member rotatably connected to the parallelogram mechanism and rotatably connected to the first stabilizing motor; and
a second force-transferring member rotatably connected to the parallelogram mechanism and rotatably connected to the second stabilizing motor.

11. The apparatus of claim 10, wherein the first force-transferring member and the second force-transferring member are symmetrically arranged at opposite sides of the parallelogram mechanism.

12. The apparatus of claim 9, wherein the first stabilizing motor and the second stabilizing motor are symmetrically arranged at opposite sides of the parallelogram mechanism.

13. The apparatus of claim 1, further comprising:
a detection circuit configured to measure a motion of the connecting assembly.

14. The apparatus of claim 13, wherein the detection circuit is mounted at the connecting assembly.

15. The apparatus of claim 13, wherein the detection circuit includes an angle sensor configured to measure a rotation angle of the connecting assembly.

16. The apparatus of claim 1, further comprising:
an elastic member arranged inside a cavity of the connecting assembly and connected to an end of the connecting assembly connected to the stabilizing motor and to another end of the connecting assembly connected to the load-connecting member;
wherein the stabilizing motor is configured to drive the connecting assembly to move to drive the load-connecting member to move along the vertical direction.

17. The apparatus of claim 16, further comprising:
an adjustment member configured to adjust an elastic force of the elastic member via adjusting a degree of deformation of the elastic member.

18. The apparatus of claim 1, further comprising:
a force-transferring member directly rotatably connected to the connecting assembly and directly rotatably connected to the stabilizing motor;
wherein the stabilizing motor is configured to drive the connecting assembly to move via the force-transferring member.

19. The apparatus of claim 1, further comprising:
a base including a base body connected to the connecting assembly, and a base extending arm extending outward from an end of the base body, the stabilizing motor being arranged at the base extending arm.

20. The apparatus of claim 19, wherein:
wherein the base extending arm is a first base extending arm, the stabilizing motor is a first stabilizing motor;
the apparatus further comprising:
a second stabilizing motor, the first stabilizing motor and the second stabilizing motor together driving the connecting assembly to move;
wherein:
the base further includes a second base extending arm extending outward from another end of the base body;
the first stabilizing motor and the second stabilizing motor are arranged at the first base extending arm and the second base extending arm, respectively; and
the first base extending arm and the second base extending arm are respectively bent toward a side of the base body proximal to the connecting assembly.

* * * * *